(12) United States Patent
Akase

(10) Patent No.: US 10,626,784 B2
(45) Date of Patent: Apr. 21, 2020

(54) ROTARY TYPE VALVE DEVICE

(71) Applicant: MIKUNI CORPORATION, Tokyo (JP)

(72) Inventor: Shogo Akase, Kanagawa (JP)

(73) Assignee: MIKUNI CORPORATION, Tokyo (JP)

( * ) Notice: Subject to any disclaimer, the term of this patent is extended or adjusted under 35 U.S.C. 154(b) by 70 days.

(21) Appl. No.: 16/135,009

(22) Filed: Sep. 19, 2018

(65) Prior Publication Data

US 2019/0085755 A1    Mar. 21, 2019

(30) Foreign Application Priority Data

Sep. 20, 2017 (JP) ................. 2017-180374

(51) Int. Cl.

| | |
|---|---|
| *F16K 11/087* | (2006.01) |
| *F01P 7/16* | (2006.01) |
| *F16K 5/20* | (2006.01) |
| *F16K 5/06* | (2006.01) |
| *F01P 11/14* | (2006.01) |
| *F16K 5/04* | (2006.01) |
| *F16K 11/02* | (2006.01) |
| *F16K 25/00* | (2006.01) |
| *F01P 7/14* | (2006.01) |

(52) U.S. Cl.
CPC ............. *F01P 7/16* (2013.01); *F01P 11/14* (2013.01); *F16K 5/0464* (2013.01); *F16K 5/0689* (2013.01); *F16K 5/204* (2013.01); *F16K 5/205* (2013.01); *F16K 11/025* (2013.01); *F16K 11/0876* (2013.01); *F16K 25/005* (2013.01); *F01P 2007/146* (2013.01)

(58) Field of Classification Search
USPC ....................................... 251/174
See application file for complete search history.

(56) References Cited

U.S. PATENT DOCUMENTS 3,575,198 A * 4/1971 Ellis ................. F16K 5/0673
137/315.18
3,584,641 A * 6/1971 Milleville ............. F16K 5/0673
137/246.15

(Continued)

FOREIGN PATENT DOCUMENTS

JP   2013245737   12/2013
JP   2013245738   12/2013

*Primary Examiner* — John Fox
(74) *Attorney, Agent, or Firm* — JCIPRNET

(57) ABSTRACT

A rotary type valve device includes a rotor having an internal passage and an opening portion which opens to an outer contour surface, a housing which supports the rotor to be rotatable and defines an axial passage communicating with the internal passage and a radial passage facing the outer contour surface and capable of communicate with the opening portion, a passage member disposed in the housing to define a part of the radial passage, and an annular seal member which seals a predetermined second clearance defined between the passage member and the housing, wherein the passage member includes an annular contact portion which is pressed so as to be in close contact with the outer contour surface by a pressure of a fluid flowing from the axial passage, and a pressed portion pressed by the pressure of the fluid flowing from the radial passage through the annular seal member.

11 Claims, 20 Drawing Sheets

(56) References Cited

U.S. PATENT DOCUMENTS

| | | | | |
|---|---|---|---|---|
| 4,262,688 | A | * | 4/1981 | Bialkowski ........... F16K 5/0663 |
| | | | | 137/242 |
| 4,572,239 | A | * | 2/1986 | Koch ................. F16K 11/0876 |
| | | | | 137/625.47 |
| 5,145,150 | A | * | 9/1992 | Brooks ................ F16K 5/0689 |
| | | | | 251/188 |
| 5,478,047 | A | * | 12/1995 | Best ..................... F16K 1/2266 |
| | | | | 251/171 |
| 7,275,564 | B2 | * | 10/2007 | Bazin ..................... F16K 5/201 |
| | | | | 137/625.47 |
| 2018/0066758 | A1 | * | 3/2018 | Yumisashi ................ F01P 7/14 |

* cited by examiner

ROTARY TYPE VALVE DEVICE

CROSS-REFERENCE TO RELATED APPLICATION

This application claims the priority of Japan patent application Ser. No. 2017-180374, filed on Sep. 20, 2017. The entirety of the above-mentioned patent application is hereby incorporated by reference herein and made a part of this specification.

BACKGROUND

Technical Field

The disclosure relates to a rotary type valve device which rotates a rotor to open and close a fluid passage, and more particularly, to a rotary type valve device applied when a flow of cooling water of an engine mounted in a vehicle or the like is controlled.

Description of Related Art

As a conventional rotary type valve device, a rotary type valve device including a cylindrical rotor which rotates around a predetermined axis, a casing which accommodates the rotor, a tubular seal member interposed between the rotor and the casing, and a drive mechanism which rotationally drives the rotor is known (for example, referring to Patent Document 1 and Patent Document 2).

In this rotary type valve device, the rotor has an internal passage which passes therethrough in an axial direction and an opening portion which opens in an outer circumferential surface thereof. The casing has a radial passage which faces the outer circumferential surface of the rotor and communicates with the opening portion and to which a connecting pipe is connected, and an axial passage which communicates with the internal passage of the rotor. Further, the seal member has an inner curved portion disposed on the radial passage side of the casing and formed to be pressed by a pressure of a fluid guided from the radial passage and thus to be brought into close contact with the outer circumferential surface of the rotor.

In a use state in which the fluid flows from the radial passage of the casing and flows out from the axial passage, the inner curved portion of the seal member is pressed by the pressure of the fluid and is brought into close contact with the outer circumferential surface of the rotor, and thus a desired sealing function can be obtained.

However, when the fluid is used to flow from the axial passage of the casing and flows out from the radial passage, the inner curved portion may be pressed in a direction away from the outer circumferential surface of the rotor by the pressure of the fluid, and a sufficient sealing function cannot be ensured.

Patent Documents

[Patent Document 1] Japanese Patent Application, First Publication No. 2013-245737

[Patent Document 2] Japanese Patent Application, First Publication No. 2013-245738

SUMMARY

It is an objective of the disclosure to solve the problems of the related art and to provide a rotary type valve device capable of obtaining desired sealing performance regardless of a flow direction of a fluid.

A rotary type valve device of the disclosure includes a rotor having an internal passage formed around a predetermined axis and an opening portion which opens outward from the internal passage to an outer contour surface in a radial direction, a housing which supports the rotor to be rotatable with a predetermined first clearance and defines an axial passage communicating with the internal passage and a radial passage facing the outer contour surface and capable of communicating with the opening portion, a passage member disposed in the housing to define a part of the radial passage; and an annular seal member which seals a predetermined second clearance defined between an outer wall surface of the passage member and an inner wall surface of the housing, wherein the passage member comprises an annular contact portion which is pressed to be in close contact with the outer contour surface by a pressure of a fluid flowing from the axial passage, and a pressed portion pressed by the annular seal member to bring the annular contact portion into close contact with the outer contour surface by the pressure of the fluid flowing from the radial passage.

BRIEF DESCRIPTION OF THE DRAWINGS

FIG. 13 is a block diagram showing a case in which the rotary type valve device shown in FIG. 11 is applied to a system which controls a flow of cooling water in an engine mounted in a vehicle or the like.

FIG. 20 is a block diagram showing a case in which the rotary type valve device according to the disclosure is applied to a system having another arrangement relationship for controlling the flow of the cooling water in the engine mounted in the vehicle or the like.

DESCRIPTION OF THE EMBODIMENTS

Figure 1:
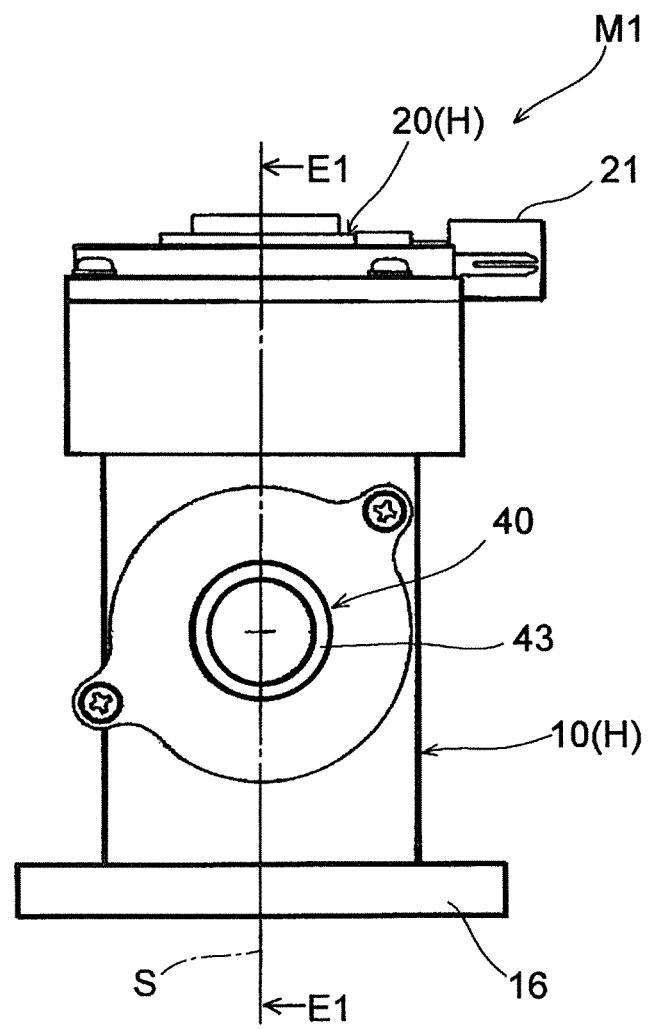
FIG. 1 is a front view showing a first embodiment of a rotary type valve device according to the disclosure.

A rotary type valve device of the disclosure includes a rotor having an internal passage formed around a predetermined axis and an opening portion which opens outward from the internal passage to an outer contour surface in a radial direction, a housing which supports the rotor to be rotatable with a predetermined first clearance and defines an axial passage communicating with the internal passage and a radial passage facing the outer contour surface and capable of communicating with the opening portion, a passage member disposed in the housing to define a part of the radial passage; and an annular seal member which seals a predetermined second clearance defined between an outer wall surface of the passage member and an inner wall surface of the housing, wherein the passage member comprises an annular contact portion which is pressed to be in close contact with the outer contour surface by a pressure of a fluid flowing from the axial passage, and a pressed portion pressed by the annular seal member to bring the annular contact portion into close contact with the outer contour surface by the pressure of the fluid flowing from the radial passage.

In the rotary type valve device having the above-described configuration, the pressed portion may be formed to be pressed by the pressure of the fluid so that the annular contact portion is brought into close contact with the outer contour surface when the pressure of the fluid flowing from the axial passage through the first clearance acts.

In the rotary type valve device having the above-described configuration, the housing may include a restricting portion which restricts movement of the annular seal member receiving the pressure of the fluid flowing from the axial passage through the first clearance.

In the rotary type valve device having the above-described configuration, the annular seal member may have a concave pressure receiving surface on a side thereof receiving the pressure of the fluid.

The rotary type valve device having the above-described configuration may further include a biasing spring which biases the passage member toward the outer contour surface.

In the rotary type valve device having the above-described configuration, the housing may include the passage member, the annular seal member, and a holding member which holds the biasing spring.

In the rotary type valve device having the above-described configuration, the holding member may have a hooking portion which restricts separation of the holding member in a state in which the passage member is incorporated, and the passage member may have a hooked portion which is hooked by the hooking portion.

In the rotary type valve device having the above-described configuration, the outer contour surface of the rotor may be formed into a spherical surface, the annular seal member may be formed into a circle-annular shape, the pressed portion of the passage member may be formed into a circle-annular stepped surface with which the annular seal member comes into contact detachably, and the annular contact portion of the passage member may be formed as a circle-annular seal lip of which a diameter is larger than the circle-annular stepped surface to be in close contact with the spherical surface.

In the rotary type valve device having the above-described configuration, the rotor may include a plurality of outer contour surfaces which are continuous in a direction of the axis, and the housing may include a plurality of radial passages which face the plurality of outer contour surfaces and are capable of communicating with the opening portion.

In the rotary type valve device having the above-described configuration, the passage member may be formed of a resin material, and the annular seal member may be formed of a rubber material.

The rotary type valve device having the above-described configuration may further include a drive mechanism which rotationally drives the rotor around the axis.

According to the rotary type valve device having the above-described configuration, in both a use form in which the fluid flows from the axial passage to the radial passage and a use form in which the fluid flows from the radial passage to the axial passage, it is possible to ensure a passage with excellent sealing performance.

That is, desired sealing performance can be obtained regardless of the flow direction of the fluid, and thus a rotary type valve device capable of performing desired flow rate control can be obtained.

Hereinafter, a first embodiment of a rotary type valve device according to the disclosure will be described with reference to FIGS. 1 to 10 of the accompanying drawings.

A rotary type valve device M1 according to the first embodiment includes a housing H, a connecting member 40, a rotor 50 which rotates around a predetermined axis S, a passage member 60, an annular seal member 70, a biasing spring 80, and a drive mechanism 90.

Here, the housing H is formed by a housing body 10, a housing cover 20, and a holding member 30.

The housing H also defines an axial passage AP in a direction of the axis S and a radial passage RP which extends in a radial direction perpendicular to the axis S.

The housing body 10 is formed of a resin material, an aluminum material, or the like and includes an accommodating chamber 11, a recessed portion 12, a bearing portion 13, a bearing portion 14, a fitting portion 15, a flange portion 16, and a joint portion 17.

The accommodating chamber 11 is formed to accommodate the rotor 50 with a predetermined first clearance C1 to be rotatable around the axis S.

The recessed portion 12 is formed for the drive mechanism 90 to be disposed therein and is covered by the housing cover 20.

The bearing portion 13 is formed to rotatably support one end side of a rotating shaft 51 of the rotor 50 and includes a fitting hole 13a which supports a reduced diameter portion 51a, a fitting hole 13b which supports a large diameter portion 51b, and a stepped surface 13c which is formed at a boundary between the fitting hole 13a and the fitting hole 13b and supports a stepped portion 51c of the rotating shaft 51 in a thrust direction.

The bearing portion 14 is formed to rotatably support the other end side of the rotating shaft 51 of the rotor 50 and includes a fitting hole 14a which supports a reduced diameter portion 51d, a contact surface 14b which supports a stepped portion 51e of the rotating shaft 51 in the thrust direction, and a plurality of communication holes 14c which communicate with the inside of the accommodating chamber 11.

Additionally, after the rotor 50 is inserted into the accommodating chamber 11, the reduced diameter portion 51d of the bearing portion 14 is fitted into the fitting hole 14a and is fitted and fixed into the flange portion 16.

The fitting portion 15 includes a stepped fitting hole 15a which fits a stepped cylindrical portion 31 of the holding member 30, and a recessed portion 15b which fits a flange portion 37 of the holding member 30.

The flange portion 16 is formed to be fixed to an application target such as an engine with screws, bolts, or the like.

The joint portion 17 is formed to join and fix the connecting member 40 by screws, welding, or the like.

The housing cover 20 is formed of a resin material, an aluminum material, or the like and includes a connector 21 which connects an electric wiring connected to the drive mechanism 90 to the outside.

Additionally, the housing cover 20 is connected to the housing body 10 using screws to cover the drive mechanism 90 disposed in the recessed portion 12 of the housing body 10.

The holding member 30 is formed of a resin material, an aluminum material, or the like and includes the stepped cylindrical portion 31, an inner wall surface 32, an inner wall surface 33, an annular stepped portion 34 serving as a restricting portion formed at a boundary between the inner wall surface 32 and the inner wall surface 33, a receiving portion 35, a radial passage 36, the flange portion 37, a fitting portion 38, and a hooking portion 39.

The stepped cylindrical portion 31 is formed to be fitted into the stepped fitting hole 15a of the housing body 10 with an O-ring interposed therebetween.

The inner wall surface 32 is formed as a circular inner circumferential surface to receive the passage member 60 with a predetermined second clearance C21.

Figure 5:
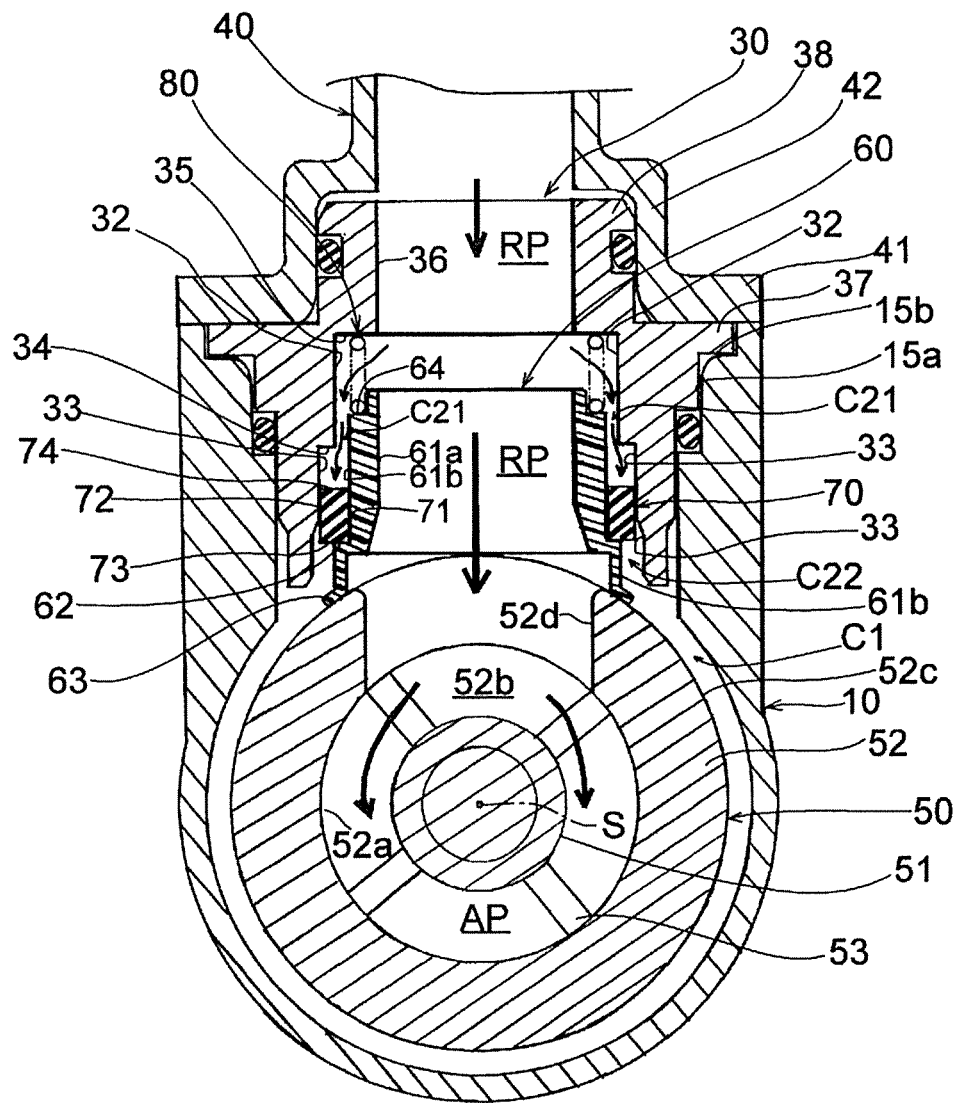
FIG. 5 is a partial cross-sectional view showing a state when a fluid flows from a radial passage in the rotary type valve device shown in FIG. 1.

Here, the second clearance C21 is defined between an outer wall surface 61b of the passage member 60 and the inner wall surface 32 of the holding member 30. Additionally, as shown in FIG. 5, when a fluid flows from the radial passage RP toward the axial passage AP, a pressure of the fluid is guided to an end surface 74 of the annular seal member 70 through the second clearance C21.

The inner wall surface 33 expands in diameter larger than the inner wall surface 32, is formed as a circular inner circumferential surface to receive the passage member 60 with a predetermined second clearance C22 and also to fit the annular seal member 70 in cooperation with the outer wall surface 61b of the passage member 60.

Figure 6:
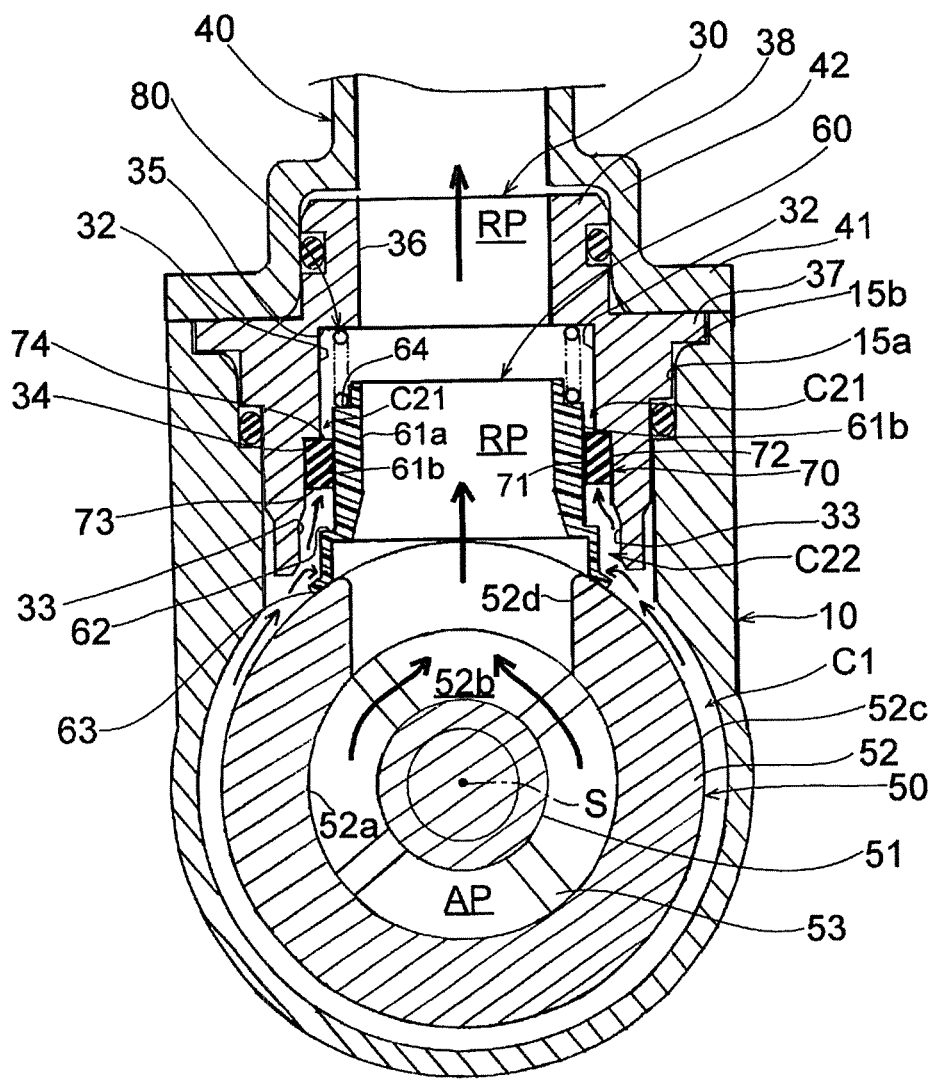
FIG. 6 is a partial cross-sectional view showing a state when a fluid flows from an axial passage in the rotary type valve device shown in FIG. 1.

Here, the second clearance C22 is defined between the outer wall surface 61b of the passage member 60 and the inner wall surface 33 of the holding member 30. Additionally, as shown in FIG. 6, when the fluid flows from the axial passage AP toward the radial passage RP, the pressure of the fluid is guided to an end surface 73 of the annular seal member 70 and guided to an annular stepped portion 62 through the first clearance C1 and the second clearance C22.

The annular stepped portion 34 is formed as a circle-annular contact surface so that the annular seal member 70 can be brought into contact therewith. Additionally, the annular stepped portion 34 serves as a restricting portion which restricts movement of the annular seal member 70 by bringing the annular seal member 70, which receives the pressure of the fluid flowing from the axial passage AP through the first clearance C1 and the second clearance C22, into contact therewith.

In this way, the end surface 73 of the annular seal member 70 receives the fluid flowing from the axial passage AP through the first clearance C1 and the second clearance C22 by providing the annular stepped portion 34 as the restricting portion. Therefore, as shown in FIG. 6, the pressure of the fluid can be reliably applied to an annular contact portion 63 and the annular stepped portion 62.

The receiving portion 35 is formed as a circle-annular seating surface to receive one end of the biasing spring 80.

The radial passage 36 defines a part of the radial passage RP of the housing H and is formed to communicate with a radial passage 61a of the passage member 60.

The flange portion 37 is formed to be fitted into the recessed portion 15b of the fitting portion 15.

The fitting portion 38 is formed for a coupling portion 42 of the connecting member 40 to be fitted therein in a state in which an O-ring is fitted into an annular groove formed in an outer circumference.

The hooking portion 39 is formed as an L-shaped notch which opens at an end surface of the stepped cylindrical portion 31 to hook a hooked portion 64 of the passage member 60 incorporated in the holding member 30.

Here, the hooking portion 39 is formed to allow movement of the hooked portion 64 within a predetermined range in a biasing direction of the biasing spring 80.

That is, the hooked portion 64 is held away from the hooking portion 39 so that a biasing force of the biasing spring 80 acts in a state in which the annular contact portion 63 of the passage member 60 is assembled to be in close contact with an outer contour surface 52c of the rotor 50.

As described above, since the holding member 30 formed separately from the housing body 10 is adopted and the hooking portion 39 is provided in the holding member 30 and the hooked portion 64 is provided on the passage member 60, after the biasing spring 80, the annular seal member 70 and the passage member 60 are assembled to the holding member 30, these components are prevented from being separated from the holding member 30 by hooking the hooked portion 64 with the hooking portion 39.

Additionally, the holding member 30 in which the biasing spring 80, the annular seal member 70, and the passage member 60 are incorporated can be handled as a modular article and can be easily assembled to the housing body 10.

The connecting member 40 is formed of a resin material, an aluminum material, another metal material, or the like and includes a flange portion 41 joined to the housing body 10, the coupling portion 42 connected to the fitting portion 38 of the holding member 30, and a pipe portion 43 which connects an external piping.

The flange portion 41 is fastened to the joint portion 17 of the housing body 10 by screws and fixed integrally. Incidentally, a fixing method is not limited to screws, and methods other than the screws such as welding may be used.

The coupling portion 42 is formed in a cylindrical shape to fit the fitting portion 38 of the holding member 30 in close contact therewith.

The pipe portion 43 is formed in a cylindrical shape to connect a piping and also to extend in a direction perpendicular to the axis S. The pipe portion 43 may be bent according to a layout of the piping to be connected.

The rotor 50 is formed of a resin material having excellent wear resistance and slidability and includes the rotating shaft 51 having the axis S, a valve portion 52, and a plurality of spoke portions 53 which connect the valve portion 52 to the rotating shaft 51.

The rotating shaft 51 includes the reduced diameter portion 51a fitted into the fitting hole 13a, the large diameter portion 51b fitted into the fitting hole 13b with an O-ring interposed therebetween, the stepped portion 51c which is in contact with the stepped surface 13c, the reduced diameter portion 51d fitted into the fitting hole 14a, and a stepped portion 51e which is in contact with the contact surface 14b.

The reduced diameter portion 51a may be fitted into the fitting hole 13a via a radial bearing.

The valve portion 52 includes a substantially cylindrical inner wall surface 52a centered on the axis S, an internal passage 52b defined between the inner wall surface 52a and the rotating shaft 51 around the axis S, the outer contour surface 52c which forms a spherical surface, and an opening portion 52d which opens outward from the internal passage 52b to the outer contour surface 52c in the radial direction perpendicular to the axis S.

The outer contour surface 52c is formed as a spherical surface having a center on the axis S and having a predetermined radius.

The opening portion 52d is formed as a circular hole having a predetermined inner diameter with a straight line perpendicular to the axis S as a center line.

The spoke portion 53 is formed to discretely connect the valve portion 52 to the rotating shaft 51 so that the internal passage 52b passes therethrough in the direction of the axis S.

The passage member 60 is formed of a resin material or the like having excellent wear resistance and slidability, disposed between the rotor 50 and the holding member 30 forming a part of the housing H and defines a part of the radial passage RP.

Figure 2:
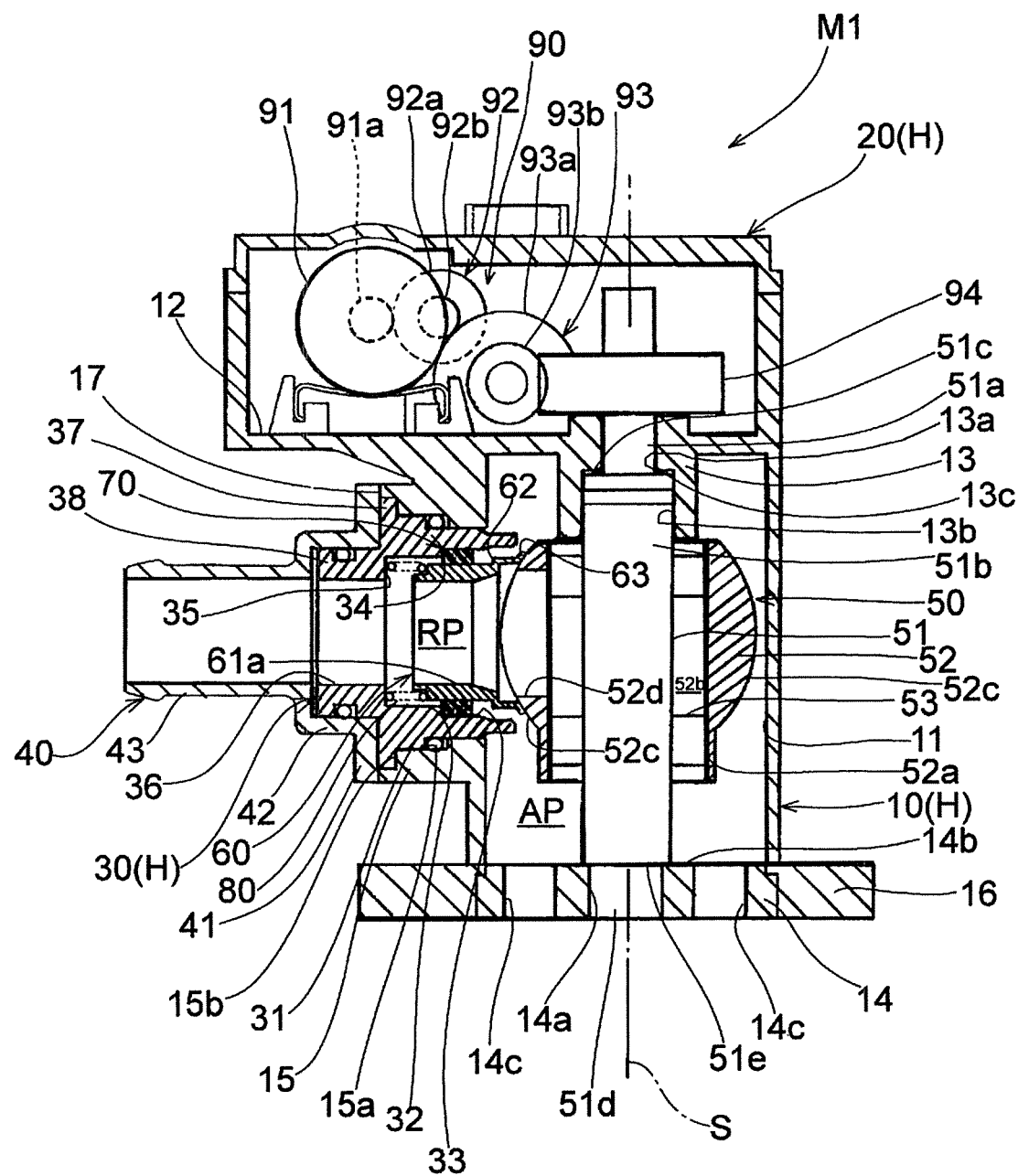
FIG. 2 is a cross-sectional view taken along line E1-E1 in FIG. 1.
Figure 3:
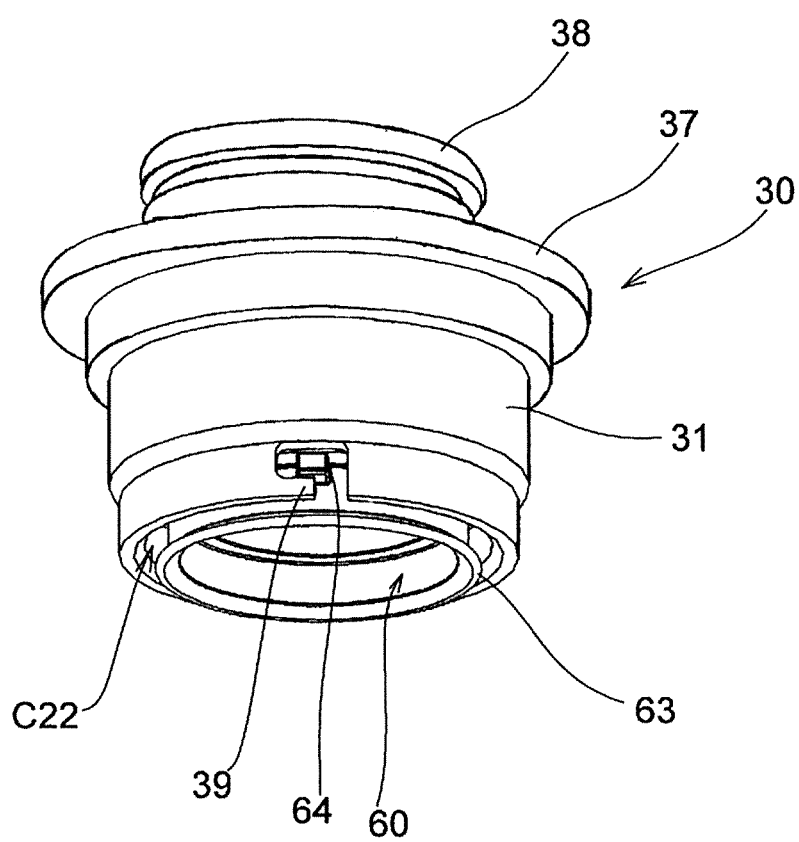
FIG. 3 is a perspective view showing a holding member and a passage member included in the rotary type valve device shown in FIG. 1.
Figure 4:
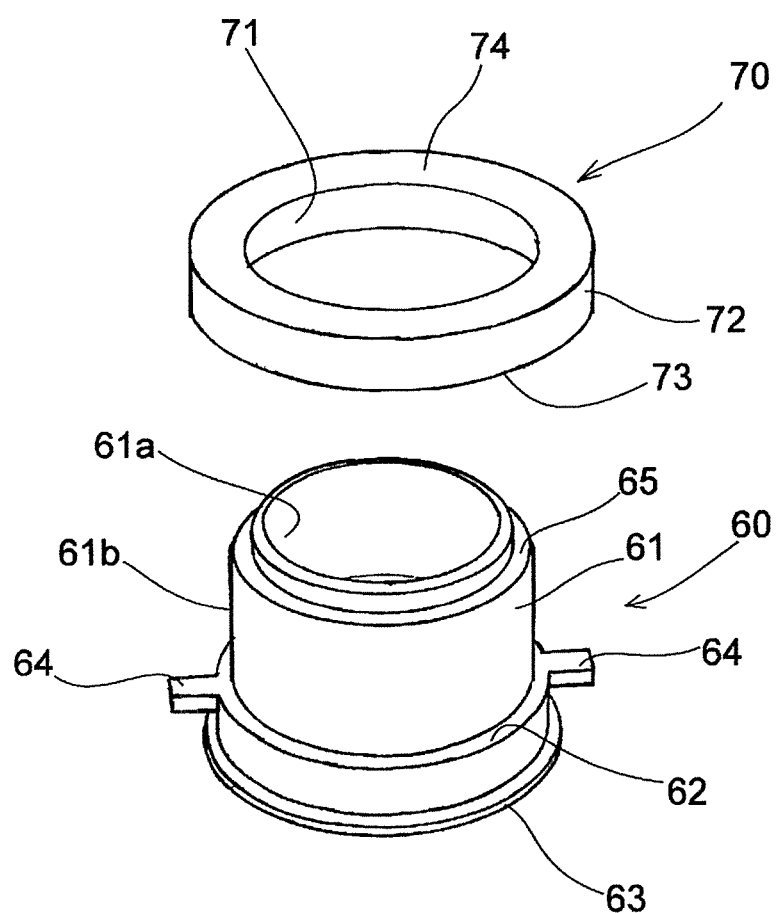
FIG. 4 is an exploded perspective view showing the passage member and an annular seal member included in the rotary type valve device shown in FIG. 1.

As shown in FIG. 2 and FIG. 4, the passage member 60 includes a cylindrical portion 61, the annular stepped portion 62 formed on an outer circumference of the cylindrical portion 61, the annular contact portion 63 formed to have a larger diameter than the annular stepped portion 62, two hooked portions 64 which protrude in the radial direction in the vicinity of the annular stepped portion 62, and a receiving portion 65 formed to have a smaller diameter than the cylindrical portion 61.

The cylindrical portion 61 includes the radial passage 61a which defines a part of the radial passage RP of the housing H at the in side thereof, and the outer wall surface 61b to the outside of which the annular seal member 70 is closely fitted.

The annular stepped portion 62 is formed as a circle-annular stepped surface so that the annular seal member 70 is detachably brought into contact therewith.

Additionally, when the pressure of the fluid flowing from the radial passage RP (36) through the second clearance C21 acts, the annular stepped portion 62 serves as a pressed portion which is pressed by the annular seal member 70 to bring the annular contact portion 63 into close contact with the outer contour surface 52c.

On the other hand, when the pressure of the fluid flowing from the axial passage AP through the first clearance C1 acts, the annular stepped portion 62 can also serve as a pressed portion which is pressed by the pressure of the fluid to bring the annular contact portion 63 into close contact with the outer contour surface 52c.

The annular contact portion 63 is formed as a circle-annular seal lip which has a diameter larger than that of the annular stepped portion 62 to be in close contact with the spherical outer contour surface 52c, extends in a flange shape forming an annular circle, and has a predetermined seal width.

Additionally, when the pressure of the fluid flowing from the axial passage AP through the first clearance C1 acts, the annular contact portion 63 is pressed by the pressure of the fluid to come into close contact with the outer contour surface 52c.

The hooked portion 64 is framed to be detachably hooked by the hooking portion 39 of the holding member 30.

Additionally, since the hooked portion 64 is hooked by the hooking portion 39 in a state in which the passage member 60 is incorporated in the holding member 30, the passage member 60 is restricted from being separated from the holding member 30.

The receiving portion 65 is formed as a circle-annular seating surface to receive the other end of the biasing spring 80 in a state in which the biasing spring 80 is disposed between the holding member 30 and the passage member 60.

Figure 7:
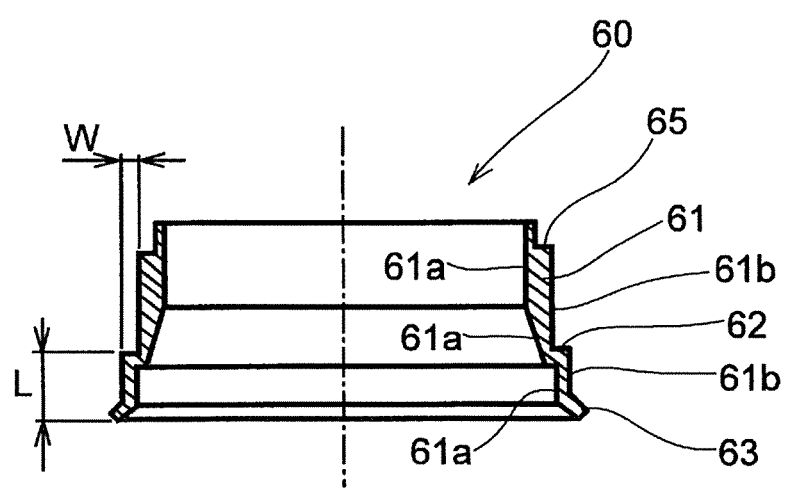
FIG. 7 is a cross-sectional view showing a shape and a dimension of the passage member included in the rotary type valve device shown in FIG. 1.

In the passage member 60 having the above configuration, as shown in FIG. 7, a width dimension W of the annular stepped portion 62 and a length dimension L from the annular stepped portion 62 to the annular contact portion 63 are important values for determining the pressure exerted by the fluid (pressing force excluding the biasing force of the biasing spring 80) to bring the annular contact portion 63 into close contact with the outer contour surface 52c.

That is, since the annular contact portion 63 is brought into close contact with the outer contour surface 52c by appropriately determining the width dimension W and the length dimension L in consideration of desired sealing performance, sliding resistance, maximum fluid pressure, biasing force of the biasing spring 80, and so on, it is possible to ensure a desired pressing force.

The annular seal member 70 is formed of a rubber material in a circle-annular shape having a substantially rectangular cross section and includes an inner circumferential surface 71, an outer circumferential surface 72, an end surface 73, and an end surface 74.

The inner circumferential surface 71 is formed to be in close contact with the outer wall surface 61b of the passage member 60.

The outer circumferential surface 72 is formed to be in close contact with the inner wall surface 33 of the holding member 30.

The end surface 73 is formed to detachably come into contact with the annular stepped portion 62 of the passage member 60.

The end surface 74 is formed to detachably come into contact with the annular stepped portion 34 of the holding member 30.

When the rubber material is molded, the annular seal member 70 may be formed by embedding a reinforcing ring formed of a metal material or the like.

The biasing spring 80 is a compression type coil spring, is accommodated inside the holding member 30 and disposed in a compressed state so that one end thereof is in contact with the receiving portion 35 of the holding member 30 and the other end is in contact with the receiving portion 65 of the passage member 60.

Additionally, the biasing spring 80 exerts a biasing force to bias the passage member 60 toward the rotor 50 so that the annular contact portion 63 is brought into close contact with the outer contour surface 52c.

As described above, since the biasing spring 80 is provided, in a use region in which the pressure of the fluid is low, the biasing force of the biasing spring 80 biases the passage member 60 against the rotor 50 so that the annular contact portion 63 can be brought into close contact with the outer contour surface 52c.

In the above-described configuration, the housing H rotatably supports the rotor 50 with the first clearance C1 therebetween and defines the axial passage AP which communicates with the internal passage 52b of the rotor 50 and the radial passage RP which faces the outer contour surface 52c of the rotor 50 and can communicate with the opening portion 52d.

Here, since the rotor 50 is rotatably supported in the housing H with the first clearance C1 therebetween, it is possible to prevent locking, malfunction, or the like due to biting of small foreign substances when the foreign substances such as granular substances are mixed in the fluid.

As shown in FIG. 2, the drive mechanism 90 includes a motor 91, a pinion 91a fixed to a rotating shaft of the motor 91, a two-stage gear 92, a gear 93, and a worm wheel 94.

The two-stage gear 92 has coaxially a large diameter gear 92a which meshes with the pinion 91a, and a small diameter gear 92b.

The gear 93 has coaxially a large diameter gear 93a which meshes with the small diameter gear 92b, and a worm 93b.

The worm wheel 94 meshes with the worm 9b and is fixed to the reduced diameter portion 51a of the rotating shaft 51.

Additionally, due to rotation of the motor 91, the rotor 50 is rotationally driven around the axis S through the pinion 91a→the two-stage gear 92→the gear 93→the worm wheel 94, and thus a position of the opening portion 52d with respect to the radial passage 61a is appropriately adjusted.

That is, as a rotational position of the rotor 50 is appropriately adjusted by the drive mechanism 90, a flow rate of the fluid flowing from the axial passage AP toward the radial passage RP or a flow rate of the fluid flowing from the radial passage RP toward the axial passage AP is controlled.

Next, an operation of the rotary type valve device M1 will be described.

Here, when the rotor 50 is rotationally driven by appropriately controlling the drive mechanism 90 and the opening portion 52d faces the radial passage 61a of the passage member 60, the rotary type valve device M1 is in a fully open state, and when the rotor 50 is gradually rotated, an opening area becomes narrow and the flow rate decreases, and when the outer contour surface 52c other than the opening portion 52d faces the radial passage 61a of the passage member 60, the rotary type valve device M1 is in a fully closed state.

Further, even when the fluid does not flow, the passage member 60 is pressed against the rotor 50 by the biasing force of the biasing spring 80 so that the annular contact portion 63 is brought into close contact with the outer contour surface 52c.

As one use form, when the fluid flows from the radial passage RP toward the axial passage AP, the flow is as shown in FIG. 5.

That is, the fluid guided from the connecting member 40 passes through the radial passages 36 and 61a serving as the radial passage RP and is supplied to a downstream supply destination connected to the flange portion 16 from the axial passage AP via the opening portion 52d of the rotor 50→the internal passage 52b.

In this flow of the fluid, the pressure of the fluid flowing from the radial passage 36 through the second clearance C21 acts on the end surface 74 of the annular seal member 70.

Therefore, the annular seal member 70 pressed by the pressure of the fluid comes into contact with the annular stepped portion (pressed portion) 62 of the passage member 60 and presses the passage member 60 toward the rotor 50 so that the annular contact portion 63 comes into close contact with the outer contour surface 52c.

In this way, since, in addition to the biasing force of the biasing spring 80, the pressure of the fluid flowing from the radial passage RP through the second clearance C21 exerts a pressing force on the passage member 60 via the annular seal member 70, the annular contact portion 63 is reliably brought into close contact with the outer contour surface 52c, and the desired sealing performance can be obtained.

When the pressure of the fluid is low, a behavior of the fluid tending to leak is also weak, and the biasing force of the biasing spring 80 acts as the pressing force, and thus the annular contact portion 63 is reliably brought into close contact with the outer contour surface 52c and the desired sealing performance can be obtained.

As another use form, when the fluid flows from the axial passage AP toward the radial passage RP, the flow is as shown in FIG. 6.

That is, the fluid guided from an upstream supply source connected to the flange portion 16 flows from the axial passage AP through the internal passage 52b of the rotor 50→the opening portion 52d to the radial passages 61a and 36 serving as the radial passage RP and is supplied from the connecting member 40 to the downstream supply destination.

In this flow of the fluid, the pressure of the fluid flowing from the axial passage AP through the first clearance C1 and the second clearance 22 acts on the end surface 73 of the annular seal member 70.

Therefore, the annular seal member 70 pressed by the pressure of the fluid comes into contact with the annular stepped portion (restricting portion) 34 of the holding member 30, and the movement thereof is restricted.

Additionally, the pressure of the fluid flowing into the second clearance C22 effectively acts on the annular stepped portion (pressed portion) 62 of the passage member 60 and the annular contact portion 63.

Therefore, the pressure of the fluid flowing into this region causes the passage member 60 to be pressed toward the rotor 50, and the annular contact portion 63 is brought into close contact with the outer contour surface 52*c*.

In this way, since, in addition to the biasing force of the biasing spring 80, the pressure of the fluid flowing from the axial passage AP through the first clearance C1 directly acts on the annular stepped portion 62 of the passage member 60 and the annular contact portion 63, the annular contact portion 63 is reliably brought into close contact with the outer contour surface 52*c*, and the desired sealing performance can be obtained.

When the pressure of the fluid is low, the behavior of the fluid tending to leak is also weak, and the biasing force of the biasing spring 80 acts as the pressing force, and thus the annular contact portion 63 is reliably brought into close contact with the outer contour surface 52*c* and the desired sealing performance can be obtained.

According to the rotary type valve device M1 having such a configuration, it is possible to secure the passage having excellent sealing performance in both the use form in which the fluid flows from the axial passage AP to the radial passage RP and the use form in which the fluid flows from the radial passage RP to the axial passage AP.

That is, desired sealing performance can be obtained regardless of the direction of fluid flow, and desired flow rate control can be performed.

Figure 8:
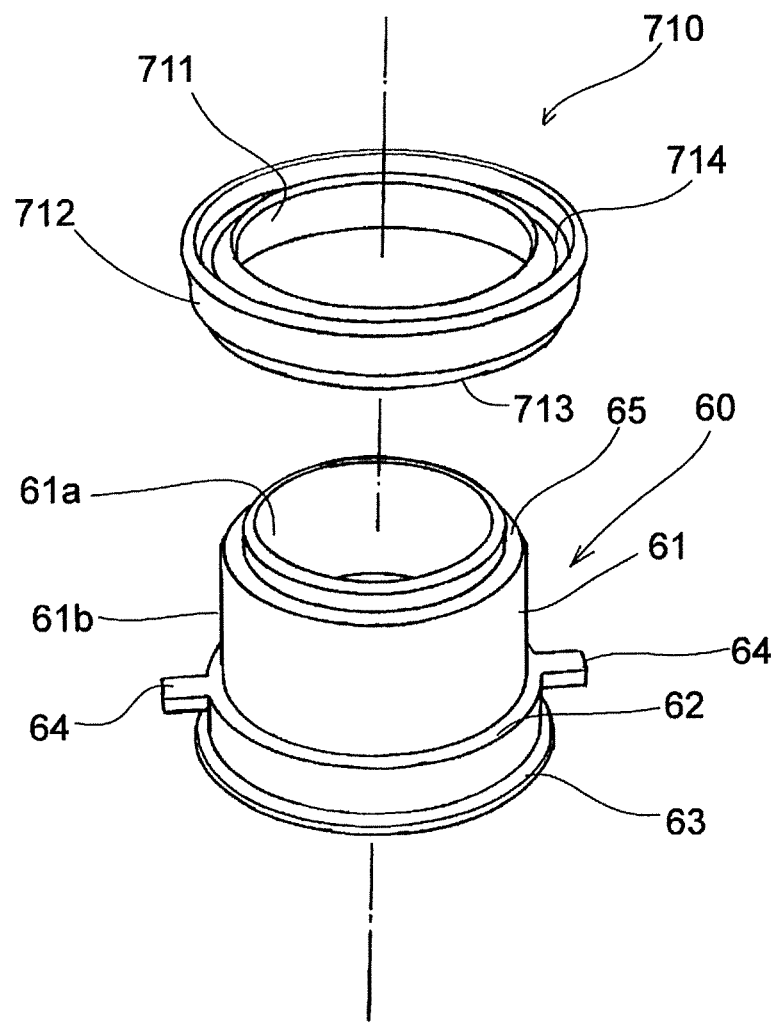
FIG. 8 shows another embodiment of the annular seal member included in the rotary type valve device shown in FIG. 1 and is an exploded perspective view of the passage member and the annular seal member.

FIG. 8 shows a modified example in which an annular seal member 70 having a concave pressure receiving surface is employed in place of the above-described annular seal member 70.

The annular seal member 710 is formed of a rubber material in a circle-annular shape forming a substantially V or U-shaped cross section and includes an inner circumferential surface 711, an outer circumferential surface 712, an end surface 713, and a concave pressure receiving surface 714.

The inner circumferential surface 711 is formed to be in close contact with the outer wall surface 61*b* of the passage member 60.

The outer circumferential surface 712 is formed to be in close contact with the inner wall surface 33 of the holding member 30.

The end surface 713 is formed to be in contact with the annular stepped portion 62 of the passage member 60 or the annular stepped portion 34 of the holding member 30.

The pressure receiving surface 714 is formed so that the inner circumferential surface 711 and the outer circumferential surface 712 can be pressed and expanded in the radial direction upon receiving the pressure of the fluid flowing through the first clearance C1 or the second clearance C21.

In addition, a reinforcing ring formed of a metal material or the like is embedded in the annular seal member 710 when the rubber material is molded.

That is, the annular seal member 710 is assembled so that the pressure of fluid acts on the pressure receiving surface 714.

Figure 9:
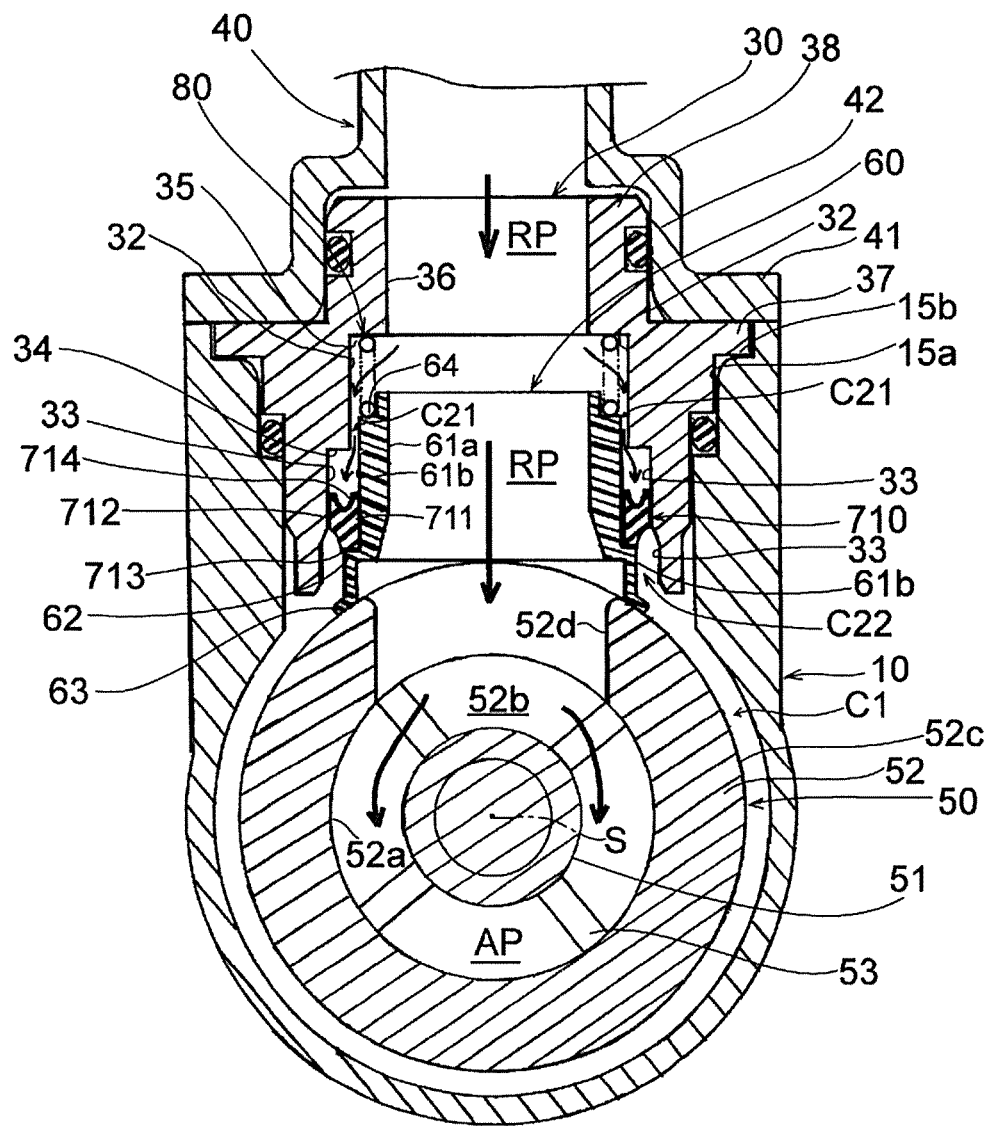
FIG. 9 is a partial cross-sectional view showing a state when the fluid flows from the radial passage in the rotary type valve device adopting the annular seal member shown in FIG. 8.

Therefore, in the use form in which the fluid flows from the radial passage RP toward the axial passage AP, as shown in FIG. 9 the pressure receiving surface 714 faces the annular stepped portion 34 of the holding member 30, and the end surface 713 is in contact with the annular stepped portion 62 of the passage member 60.

Figure 10:
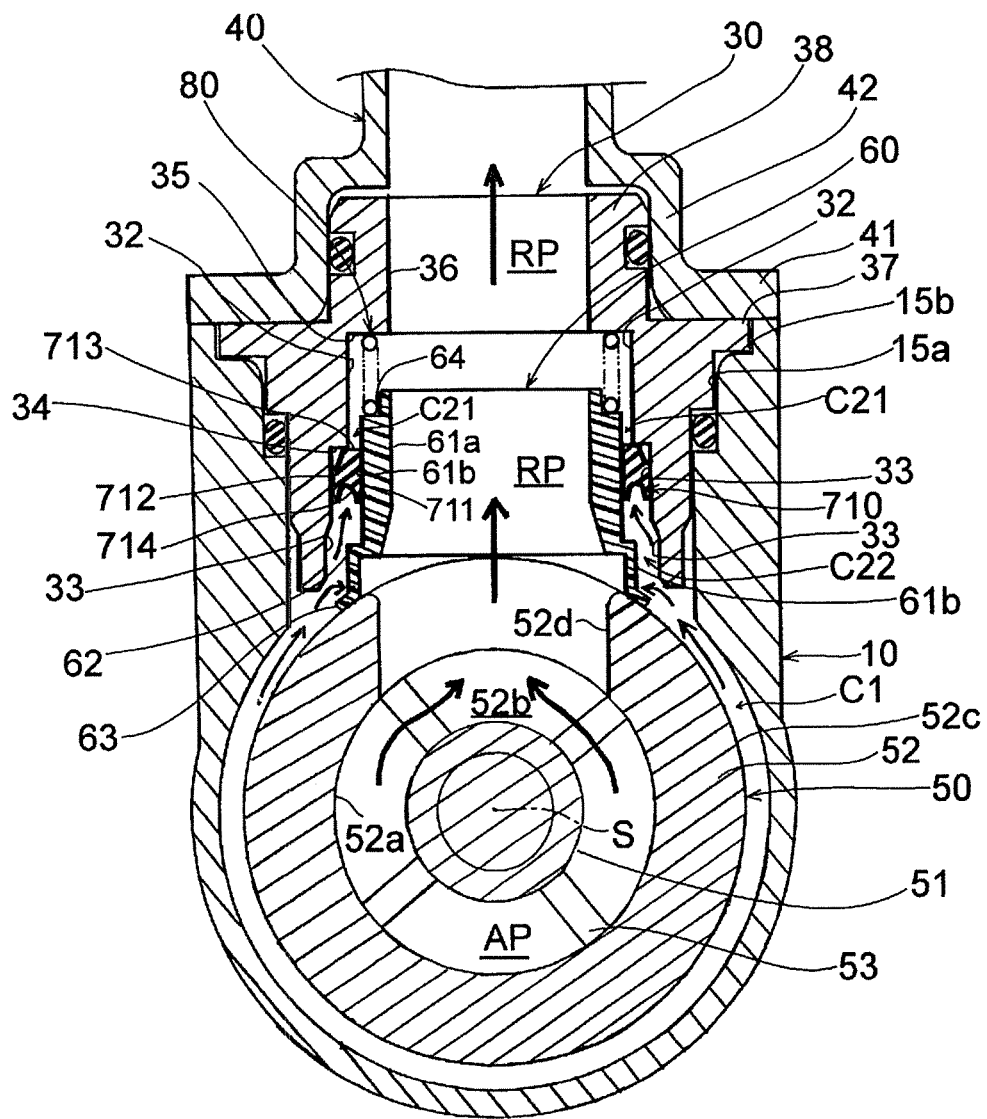
FIG. 10 is a partial cross-sectional view showing a state when the fluid flows from the axial passage in the rotary type valve device adopting the annular seal member shown in FIG. 8.
Figure 11:
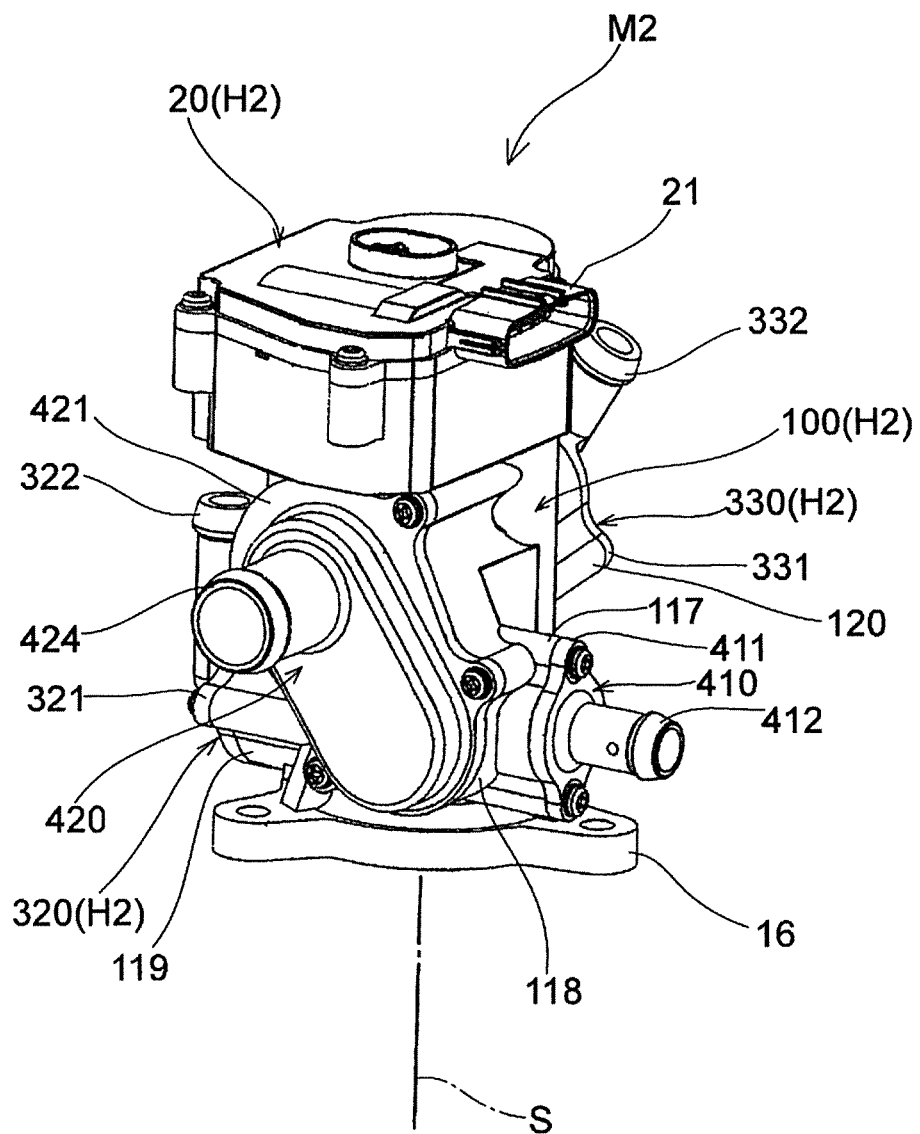
FIG. 11 is an external perspective view showing a rotary type valve device according to a second embodiment of the disclosure.
Figure 12:
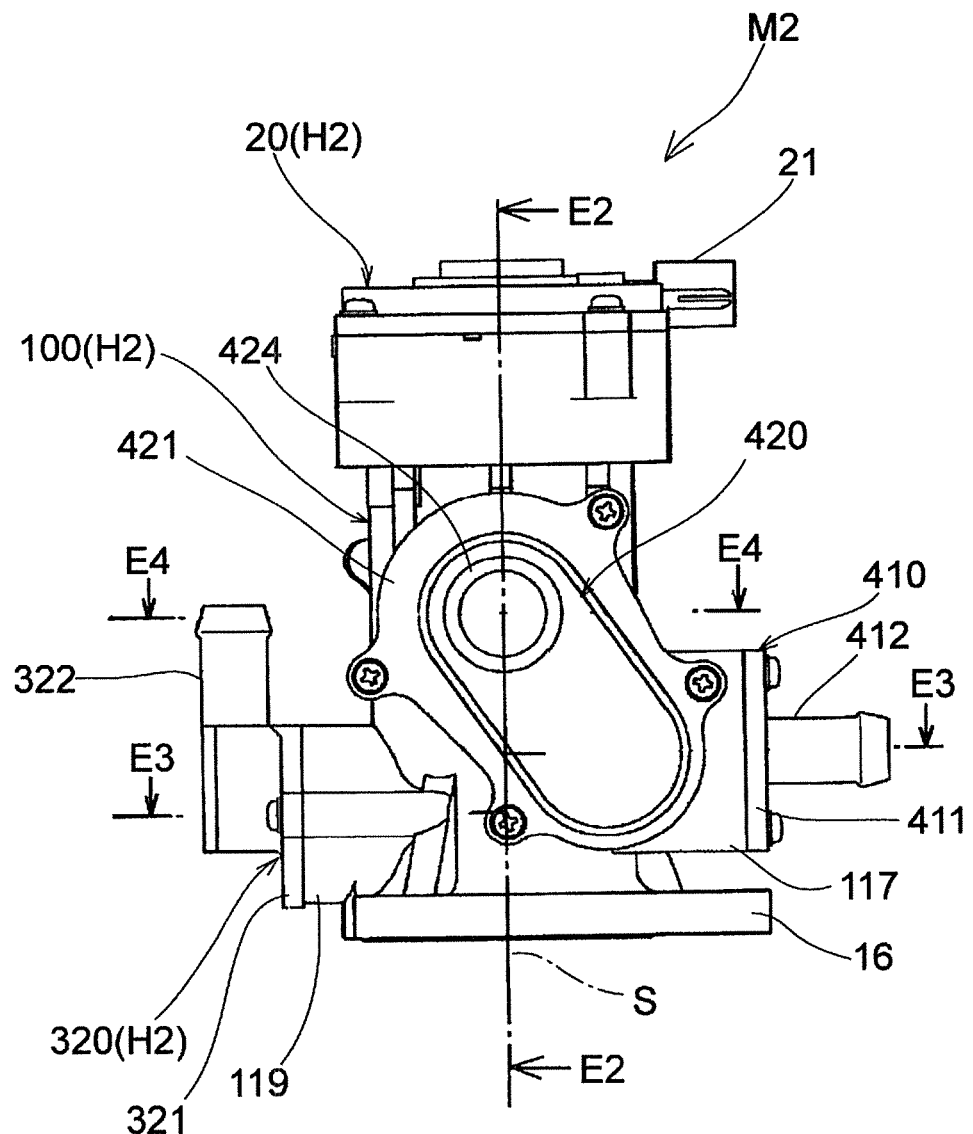
FIG. 12 is a front view of the rotary type valve device shown in FIG. 11.

On the other hand, in the use form in which the fluid flows from the axial passage AP toward the radial passage RP, as shown in FIG. 10, the pressure receiving surface 714 faces the annular stepped portion 62 of the passage member 60, and the end surface 713 is in contact with the annular stepped portion 34 of the holding member 30.

The operation of the rotary type valve device M1 in which the annular seal member 710 is incorporated is the same as those described above, and an action of the pressure receiving surface 714 is added.

As one use form, when the fluid flows from the radial passage RP toward the axial passage AP, the flow is as shown in FIG. 9.

That is, in the flow of the fluid, the pressure of the fluid flowing from the radial passage 36 through the second clearance C21 acts on the pressure receiving surface 714 of the annular seal member 710.

Therefore, the annular seal member 710 pressed by the pressure of the fluid comes into contact with the annular stepped portion (pressed portion) 62 of the passage member 60 and presses the passage member 60 toward the rotor 50 so that the annular contact portion 63 is brought into close contact with the outer contour surface 52*c*.

Further, due to the pressure of the fluid acting on the pressure receiving surface 714, the annular seal member 710 is pressed and expanded in the radial direction thereof, the inner circumferential surface 711 is pressed to be in closer contact with the outer wall surface 61*b*, and the outer circumferential surface 712 is also pressed to be in closer contact with to the inner circumferential surface 33.

In this way, in addition to the biasing force of the biasing spring 80, the pressure of the fluid flowing from the radial passage RP through the second clearance C21 exerts the pressing force on the passage member 60 via the annular seal member 710 and also presses the annular seal member 710 against the passage member 60 and the holding member 30.

Therefore, the annular seal member 710 is brought into close contact with the passage member 60 and the holding member 30, the annular contact portion 63 is reliably brought into close contact with the outer contour surface 52*c*, and thus the sealing performance can be enhanced.

When the pressure of the fluid is low, the behavior of the fluid tending to leak is also weak, and the biasing force of the biasing spring 80 acts as the pressing force as described above, thus the annular contact portion 63 is reliably brought into close contact with the outer contour surface 52*c*, and the desired sealing performance can be obtained.

As another usage form, when the fluid flows from the axial passage AP toward the radial passage RP, the flow is as shown in FIG. 10.

That is, in the flow of the fluid, the pressure of the fluid flowing from the axial passage AP through the first clearance C1 and the second clearance C22 acts on the pressure receiving surface 714 of the annular seal member 710.

Therefore, the annular seal member 710 pressed by the pressure of the fluid comes into contact with the annular stepped portion (restricting portion) 34 of the holding member 30, and the movement thereof is restricted.

Further, due to the pressure of the fluid acting on the pressure receiving surface 714, the annular seal member 710 is pressed and expanded in the radial direction thereof, the inner circumferential surface 711 is pressed to be in closer contact with the outer wall surface 61*b*, and the outer circumferential surface 712 is also pressed to be in closer contact with the inner circumferential surface 33.

Additionally, the pressure of the fluid flowing into the second clearance C22 effectively acts on the annular stepped portion (pressed portion) 62 of the passage member 60 and the annular contact portion 63.

Therefore, the pressure of the fluid flowing into this region causes the passage member 60 to be pressed toward the rotor 50, and the annular contact portion 63 is brought into close contact with the outer contour surface 52c.

In this way, in addition to the biasing force of the biasing spring 80, the pressure of the fluid flowing from the axial passage AP through the first clearance C1 presses the annular seal member 710 against the passage member 60 and the holding member 30 and also directly acts on the annular stepped portion 62 of the passage member 60 and the annular contact portion 63.

Therefore, the annular seal member 710 is brought into close contact with the passage member 60 and the holding member 30, the annular contact portion 63 is reliably brought into close contact with the outer contour surface 52c, and thus the sealing performance can be enhanced.

When the pressure of the fluid is low, the behavior of the fluid tending to leak is also weak, and the biasing force of the biasing spring 80 acts as the pressing force as described above, thus the annular contact portion 63 is reliably brought into close contact with the outer contour surface 52c, and the desired sealing performance can be obtained.

As described above, according to the rotary type valve device M1 in which the annular seal member 710 is incorporated, it is possible to secure the passage having excellent sealing performance in both the use form in which the fluid flows from the axial passage AP to the radial passage RP and the use form in which the fluid flows from the radial passage RP to the axial passage AP.

That is, the desired sealing performance can be obtained regardless of the flow direction of the fluid, and desired flow rate control can be performed.

A case in which an assembling direction of the annular seal member 710 is changed according to the use forms as described above is also within the scope of the disclosure.

The configuration in which the holding member 30 and the connecting member 40 are separately formed and incorporated has been described in the first embodiment. However, the disclosure is not limited thereto, and a configuration in which the holding member 30 and the connection member 40 are integrally formed may be adopted.

Next, a second embodiment of the rotary type valve device according to the disclosure will be described with reference to FIGS. 11 to 20 of the accompanying drawings. The same reference numerals are given to the same components as those in the first embodiment, and the description thereof will be omitted.

A rotary type valve device M2 according to the second embodiment includes a housing H2, two connecting members 410 and 420, a rotor 500 which rotates around a predetermined axis S, three passage members 60, three annular seal members 710, three biasing springs 80, a drive mechanism 90, and a thermostat 600.

The housing H2 is formed by a housing body 100, a housing cover 20, and three holding members 310, 320 and 330.

Further, the housing H2 also defines an axial passage AP in a direction of the axis S and a radial passage RP which extends in a radial direction perpendicular to the axis S.

The three passage members 60, three annular seal members 710, and three biasing springs 80 are for red as substantially similar shapes having different dimensions according to mounting positions thereof, but because they are functionally identical to those in the above-described embodiment, they are designated by the same reference numerals.

Figure 13:
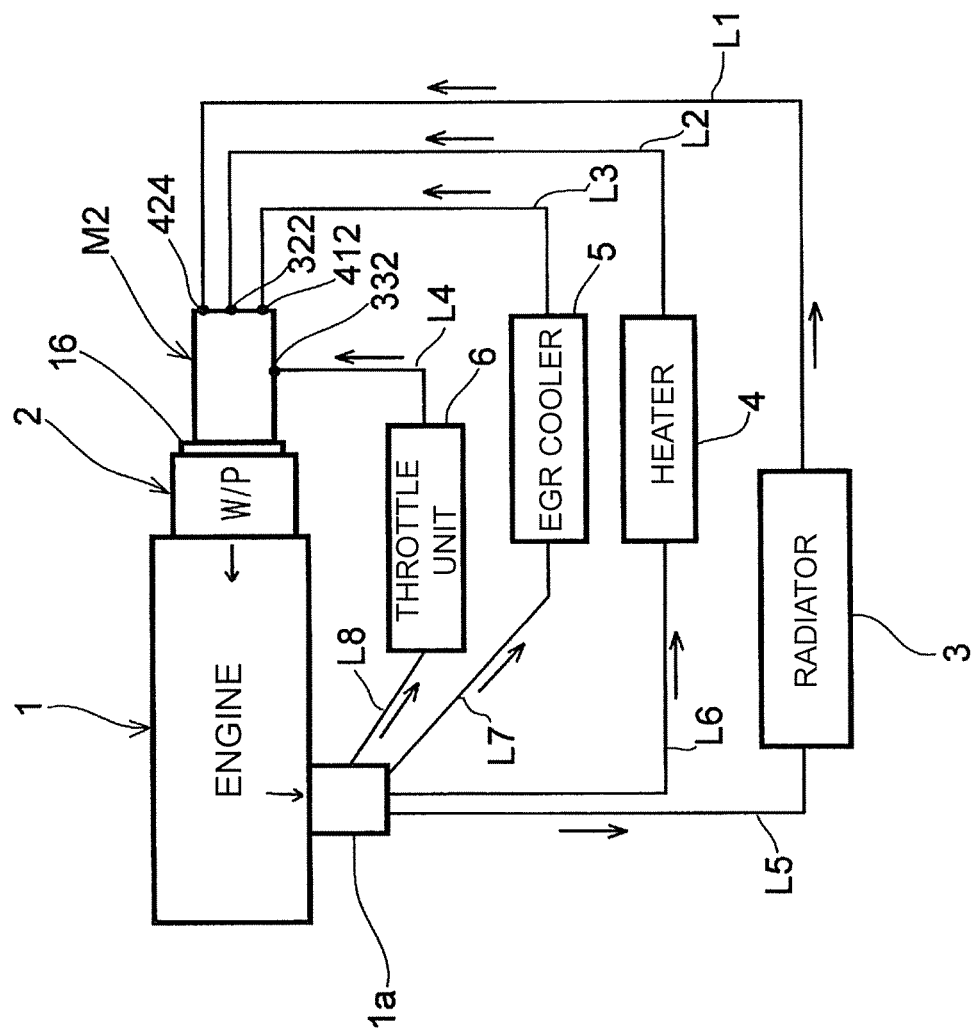
Figure 14:
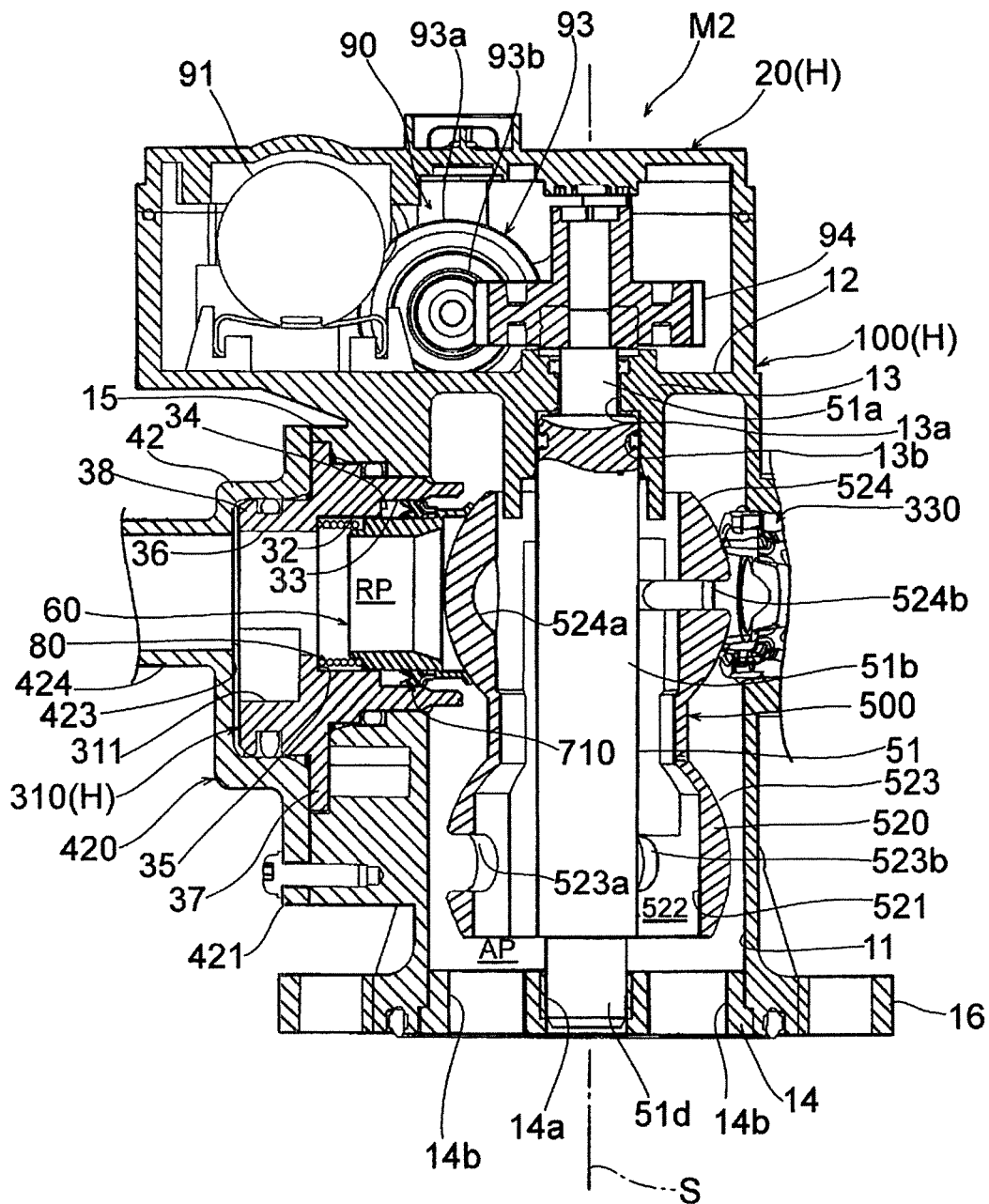
FIG. 14 is a cross-sectional view taken along line E2-E2 in FIG. 12.

As shown in FIG. 13, the rotary type valve device M2 is applied to a cooling water control system for controlling a flow of cooling water of an engine 1 mounted in a vehicle.

The cooling water control system includes a water pump 2 assembled to the engine 1, the rotary type valve device M2 installed on an upstream side of the water pump 2, a radiator 3, a heater 4, an EGR cooler 5, and a throttle unit 6.

The rotary type valve device M2 is connected to the radiator 3 via a piping L1, to the heater 4 via a piping L2, to the EGR cooler 5 via a piping L3 and to the throttle unit 6 via a piping L4.

Also, an outlet 1a of the engine 1 is connected to the radiator 3 via a piping L5, to the heater 4 via a piping L6, to the EGR cooler 5 via a piping L7 and to the throttle unit 6 via a piping L8.

Additionally, the cooling water discharged from the outlet 1a of the engine 1 due to a pumping action of the water pump 2 flows from the radial passage RP of the rotary type valve device M2 and flows out from the axial passage AP and flows into the water pump 2 through the piping L5→the radiator 3→the piping L1, the piping L6→the heater 4→the piping L2, the piping L7→the EGR cooler 5→the piping L3 and the piping L8→the throttle unit 6→the piping L4, respectively.

The housing body 100 is formed of a resin material, an aluminum material, or the like and includes an accommodating chamber 11, a recessed portion 12, a bearing portion 13, a bearing portion 14, three fitting portions 15, a flange portion 16, four joint portions 117, 118, 119 and 120, and an accommodating portion which accommodates the thermostat 600.

The three fitting portions 15 are formed as substantially similar shapes having different dimensions, but because they are functionally identical to those in the above-described embodiment, they are designated by the same reference numerals.

The accommodating chamber 11 is formed to accommodate the rotor 500 with a predetermined first clearance C1 to be rotatable around the axis S.

The joint portion 117 is formed to join and fix the connecting member 410 by screws.

The joint portion 118 is formed to join and fix the connecting member 420 by screws in a region of the fitting portion 15 into which the holding member 310 is fitted.

The joint portion 119 is formed to join and fix the holding member 320 by screws in a region of the fitting portion 15 into which the holding member 320 is fitted.

The joint portion 120 is formed to join and fix the holding member 330 by screws in a region of the fitting portion 15 into which the holding member 330 is fitted.

The holding member 310 holds the passage member 60, the annular seal member 710 and the biasing spring 80 which face an opening portion 524a of the rotor 500 and includes a stepped cylindrical portion 31, an inner wall surface 32, an inner wall surface 33, an annular stepped portion 34, a receiving portion 35, a radial passage 36, a flange portion 37, a fitting portion 38, a hooking portion 39, and a bypass passage 311 which communicates with the thermostat 600.

The bypass passage 311 allows the axial passage AP and a passage of the connecting member 420 to communicate with each other when the thermostat 600 opens at a predetermined temperature or more.

The holding member 320 holds the passage member 60, the annular seal member 710 and the biasing spring 80 which face an opening portion 523a of the rotor 500 and includes the stepped cylindrical portion 31, the inner wall surface 32, the inner wall surface 33, the annular stepped portion 34, the receiving portion 35, the radial passage 36, the fitting portion 38, the hooking portion 39, a flange portion 321, and a pipe portion 322 which connects the piping L2.

The flange portion 321 is fitted into a recessed portion 15b formed in the fitting portion 15 of the housing body 100 and fastened and fixed by screws.

The holding member 330 holds the passage member 60, the annular seal member 710, and the biasing spring 80 which face an opening portion 524b of the rotor 500 and includes the stepped cylindrical portion 31, the inner wall surface 32, the inner wall surface 33, the annular stepped portion 34, the receiving portion 35, the radial passage 36, the fitting portion 38, the hooking portion 39, a flange portion 331, and a pipe portion 332 which connects the piping L4.

The flange portion 331 is fitted into the recessed portion 15b formed in the fitting portion 15 of the housing body 100 and fastened and fixed by screws.

The connecting member 410 includes a flange portion 411 joined to the housing body 100 and a pipe portion 412 which connects the piping L3.

The flange portion 411 is fastened and fixed to the joint portion 117 of the housing body 100 with screws.

Additionally, regardless of a rotational position of the rotor 500, the connecting member 410 always communicates with the axial passage AP in the housing H2, and the pipe portion 412 is connected to the EGR cooler 5 via the piping L3.

The connecting member 420 includes a flange portion 421 joined to the housing body 100, a coupling portion 42, a bypass passage 423 which communicates with the thermostat 600, and a pipe portion 424 which connects the piping L1.

The flange portion 421 is fastened and fixed to the joint portion 118 of the housing body 100 by screws.

The bypass passage 423 cooperates with the bypass passage 311 to communicate the axial passage AP with the passage of the connecting member 420 when the thermostat 600 opens at the predetermined temperature or more.

The rotor 500 is formed of a resin material having excellent wear resistance and slidability and includes a rotating shaft 51 having the axis S, a valve portion 520, and a plurality of spoke portions 530 which connects the valve portion 520 to the rotating shaft 51.

The valve portion 520 includes a substantially cylindrical inner wall surface 521 centered on the axis S, an internal passage 522 defined between the inner wall surface 521 and the rotating shaft 51 around the axis S, two spherical outer contour surfaces 523 and 524 which are continuous in the direction of the axis S, two opening portions 523a and 523b which open outward from the internal passage 522 to the outer contour surface 523 in the radial direction perpendicular to the axis S, and two opening portions 524a and 524b which open outward from the internal passage 522 to the outer contour surface 524 in the radial direction perpendicular to the axis S.

Each of the outer contour surfaces 523 and 524 is formed as a spherical surface having a center on the axis S and having a predetermined radius.

Figure 16:
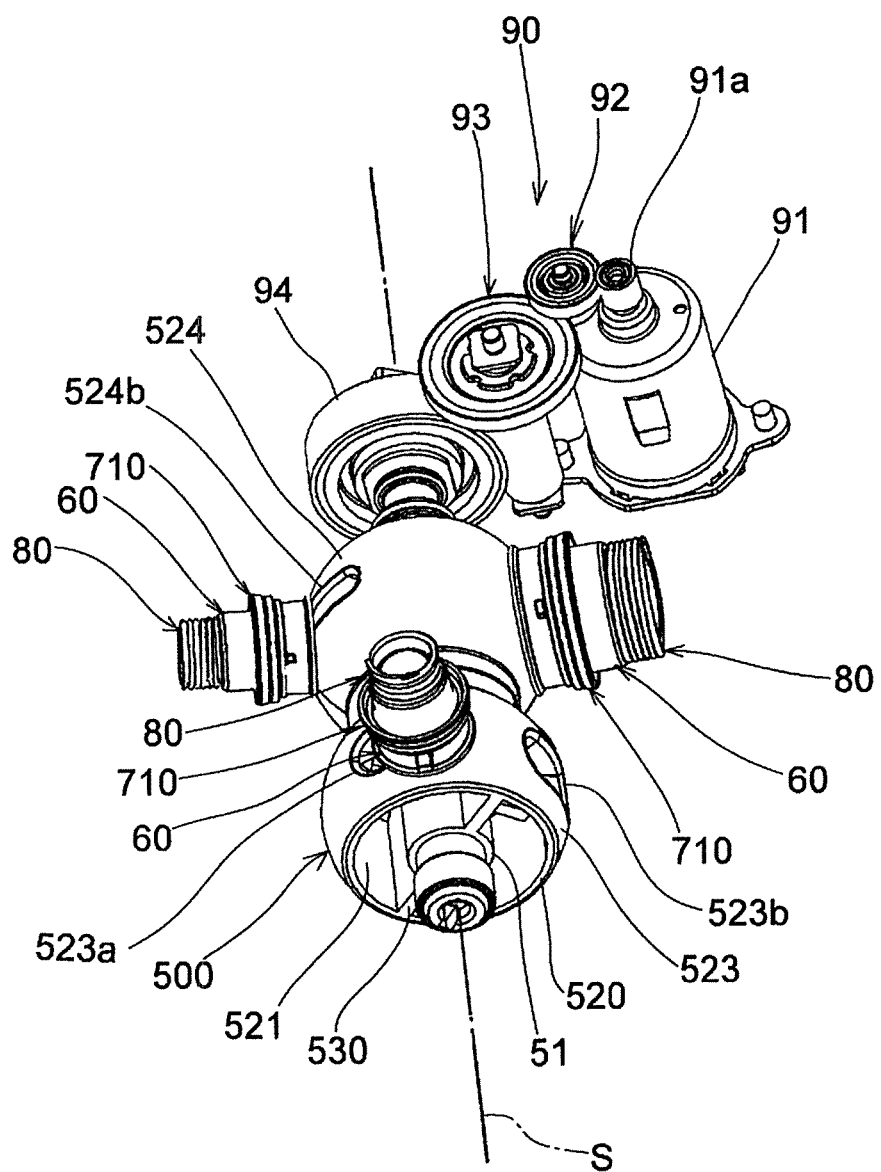
FIG. 16 is an exploded perspective view showing the rotor, the passage member, the annular seal member, the biasing spring, and the drive mechanism included in the rotary type valve device shown in FIG. 11.
Figure 17:
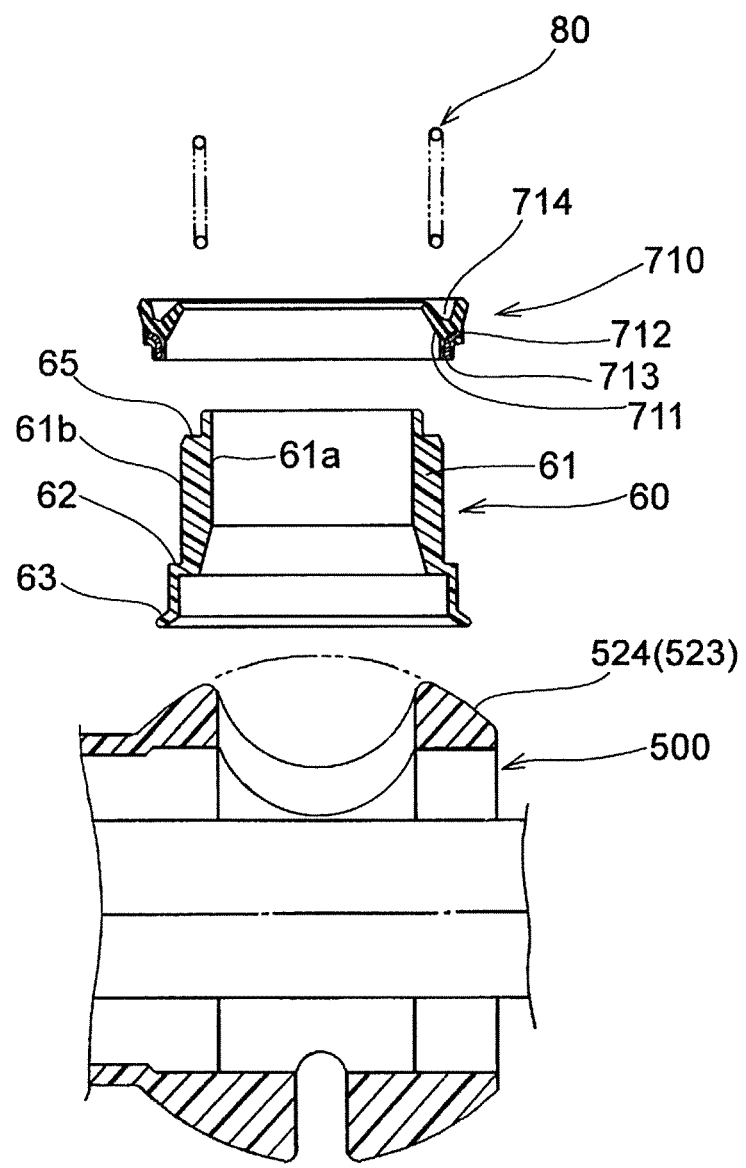
FIG. 17 is a partial exploded cross-sectional view showing the rotor, the passage member, the annular seal member, the biasing spring, and so on included in the rotary type valve device shown in FIG. 11.

As shown in FIG. 16, the opening portion 523a is formed as a circular hole having a predetermined inner diameter with a straight line perpendicular to the axis S as a center line in the outer contour surface 523 and also formed so that a central angle around the axis S occupies about 20 degrees.

As shown in FIG. 16, the opening portion 523b is formed as a long hole which extends in a circumferential direction with the same width as an inner diameter of the opening portion 523a in the outer contour surface 523 and also formed so that a central angle around the axis S occupies about 50 degrees.

Figure 15:
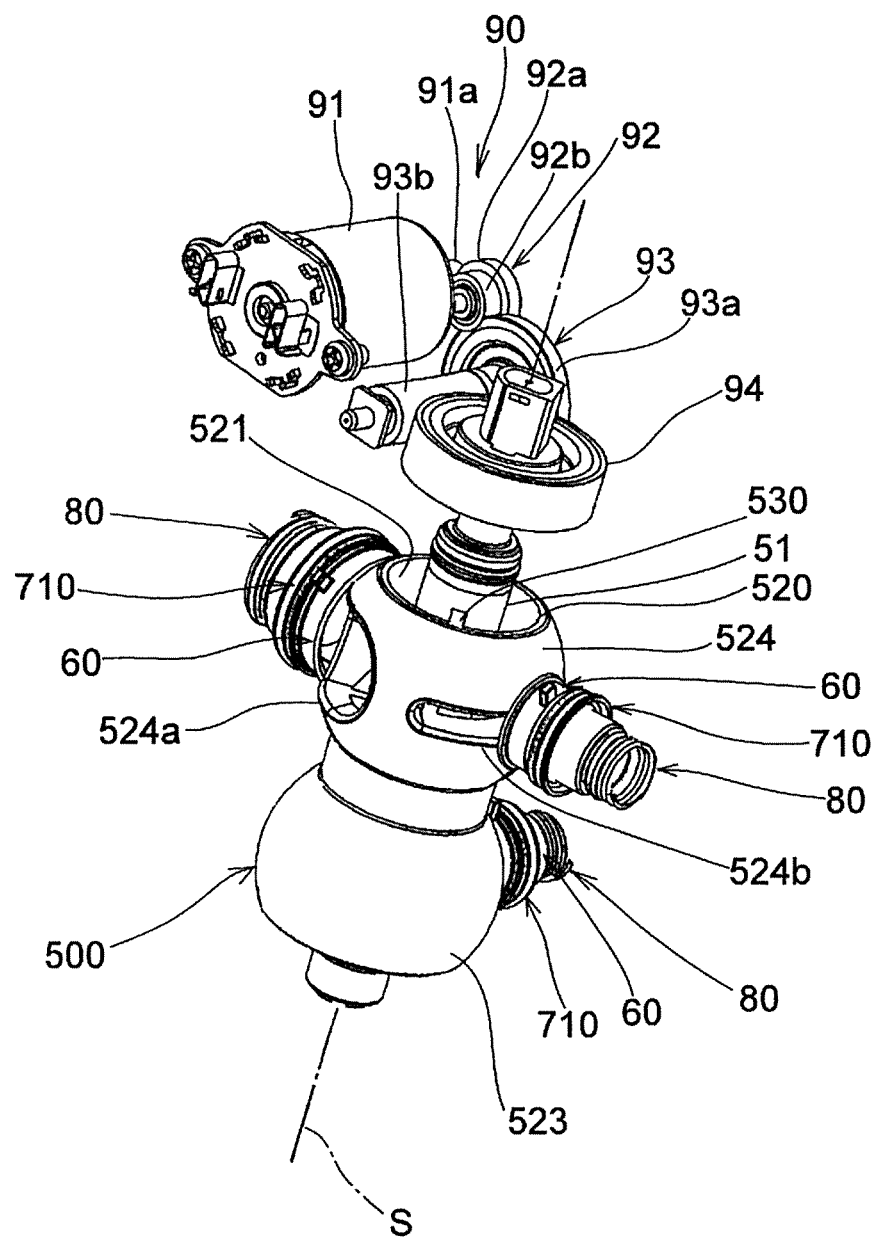
FIG. 15 is an exploded perspective view showing a rotor, a passage member, an annular seal member, a biasing spring, and a drive mechanism included in the rotary type valve device shown in FIG. 11.

As shown in FIG. 15, the opening portion 524a is formed as a long hole which extends in the circumferential direction with an opening area larger than that of the opening portion 523a in the outer contour surface 524 and also formed so that a central angle around the axis S occupies about 90 degrees.

As shown in FIGS. 15 and 16, the opening portion 524b is formed as a long hole which extends in the circumferential direction with a width narrower than that of the opening portion 524a in the outer contour surface 524 and also formed so that a central angle around the axis S occupies about 120 degrees.

Figure 18:
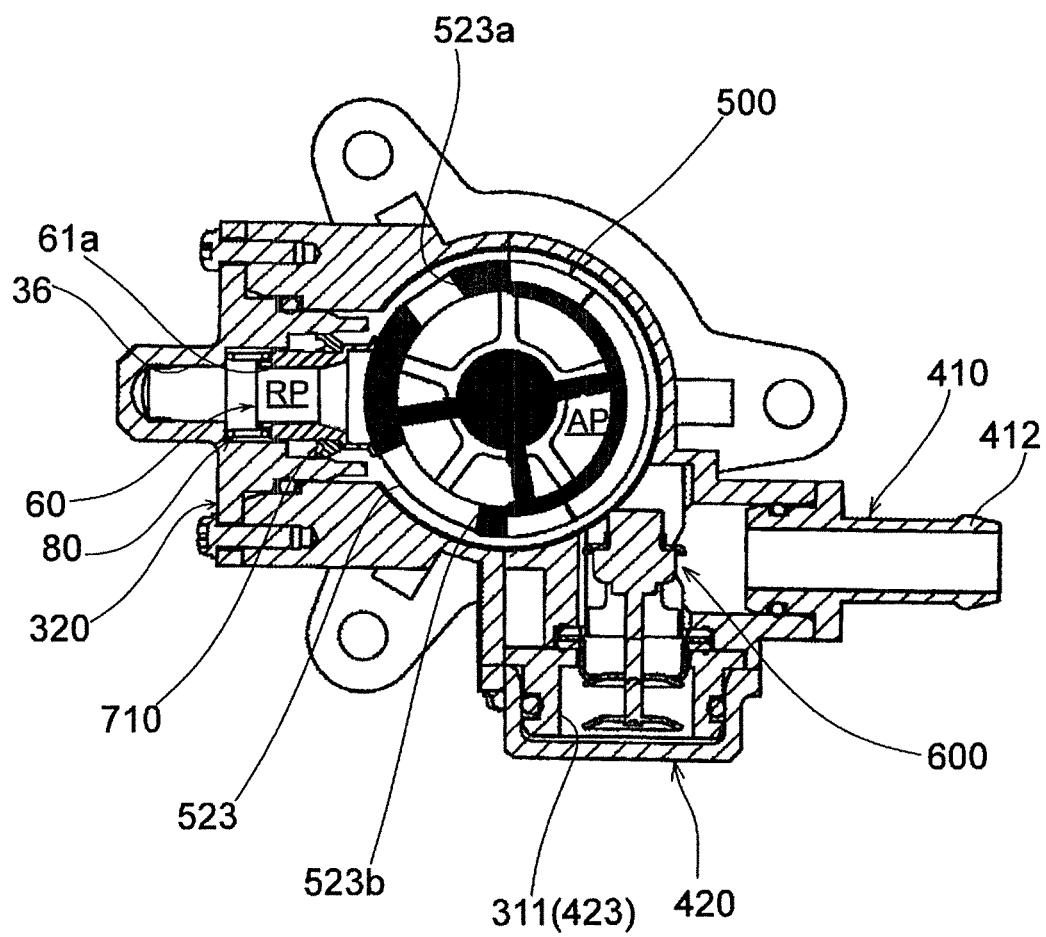
FIG. 18 is a sectional view taken along line E3-E3 in FIG. 11 when the rotor is in a rotational position in Mode 3 in the rotary type valve device shown in FIG. 11.

Here, a center of the opening portion 523b is formed at a position in which a phase thereof is deviated from a center of the opening 523a by about 100 degrees in the counterclockwise direction in FIG. 18.

Figure 19:
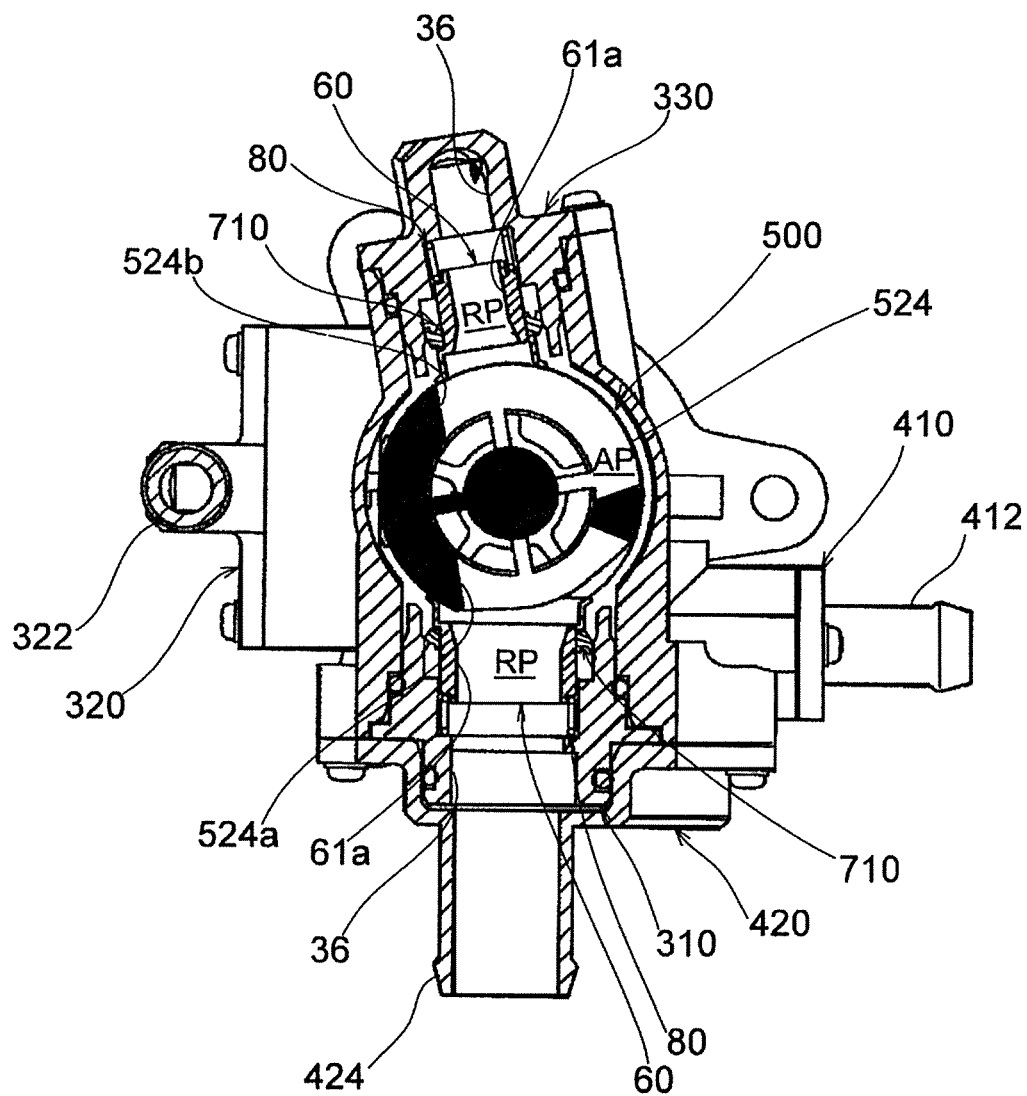
FIG. 19 is a sectional view taken along line E4-E4 in FIG. 11 when the rotor is in the rotational position in Mode 3 in the rotary type valve device shown in FIG. 11.

A center of the opening portion 524a is formed at a position in which a phase thereof is deviated from a center of the opening 523a by about 80 degrees in the counterclockwise direction in FIG. 18 and FIG. 19.

A center of the opening portion 524b is formed at a position in which a phase thereof is deviated from a center of the opening 523a by about 60 degrees in the clockwise direction in FIG. 18 and FIG. 19.

The spoke portion 530 is formed to discretely connect the valve portion 520 to the rotating shaft 51 so that the internal passage 522 passes therethrough in the direction of the axis S.

In the second embodiment, the annular contact portions 63 of the three passage members 60 are pressed to be in close contact with the outer contour surfaces 523 and 524 of the rotor 500, respectively.

The thermostat 600 includes a temperature sensing medium and performs a valve opening operation by expansion of the temperature sensing medium to communicate the axial passage AP with a passage of the connecting member 420 (a passage in the pipe portion 424) communicating with the piping L1 when the temperature of the fluid becomes equal to or higher than a predetermined level.

Next, an operation of the rotary type valve device M2 will be described.

Here, the cooling water of the engine 1 is set to flow from the radial passage RP toward the axial passage AP.

Further, the rotation of the rotor 500 is appropriately controlled by the driving mechanism 90, and states of Mode 1, Mode 2, Mode 3, Mode 4, and Mode 5 can be set.

In all Modes, the EGR cooler 5 is in a state in which the cooling water can always be supplied regardless of the rotational position of the rotor 500.

In Mode 1, the supply of the cooling water to the radiator 3 and the heater 4 is stopped, and the cooling water is supplied to the EGR cooler 5 and the throttle unit 6.

That is, Mode 1 is established in a state in which the rotor 500 is rotated about 90 degrees from the position shown in FIGS. 18 and 19 in the counterclockwise direction.

In this state, the radial passages 36 and 61a in a region of the holding member 310 communicating with the radiator 3 are blocked by the outer contour surface 524, the radial passages 36 and 61a in a region of the holding member 320 communicating with the heater 4 are blocked by the outer contour surface 523, and the radial passages 36 and 61a in a region of the holding member 330 communicating with the throttle unit 6 communicate with the opening portion 524b.

In Mode 2, the supply of the cooling water to the radiator 3 is stopped, and the cooling water is supplied to the heater 4, the EGR cooler 5 and the throttle unit 6.

That is, Mode 2 is established in a state in which the rotor 500 is rotated about 70 degrees from the position shown in FIGS. 18 and 19 in the counterclockwise direction.

In this state, the radial passages 36 and 61a in the region of the holding member 310 communicating with the radiator 3 are blocked by the outer contour surface 524, the radial passages 36 and 61a in the region of the holding member 320 communicating with the heater 4 communicate with the opening portion 523a, and the radial passages 36 and 61a in the region of the holding member 330 communicating with the throttle unit 6 communicate with the opening portion 524b.

In Mode 3, the supply of the cooling water to the heater 4 is stopped, and the cooling water is supplied to the radiator 3, the EGR cooler 5, and the throttle unit 6. That is, Mode 3 is established in a state in which the rotor 500 is in positions shown in FIGS. 18 and 19.

In this state, the radial passages 36 and 61a in the region of the holding member 320 communicating with the heater 4 are blocked by the outer contour surface 523, the radial passages 36 and 61a in the region of the holding member 310 communicating with the radiator 3 communicate with the opening portion 524a, and the radial passages 36 and 61a in the region of the holding member 330 communicating with the throttle unit 6 communicate with the opening portion 524b.

In Mode 4, the cooling water is supplied to the radiator 3, the heater 4, the EGR cooler 5, and the throttle unit 6.

That is, Mode 4 is established in a state in which the rotor 500 is rotated back and forth about 15 degrees from the positions shown in FIGS. 18 and 19 in the clockwise direction.

In this state, the radial passages 36 and 61a in the region of the holding member 310 communicating with the radiator 3 communicate with the opening portion 524a, the radial passages 36 and 61a in the region of the holding member 320 communicating with the heater 4 communicate with the opening portion 523b, and the radial passages 36 and 61a of the region of the holding member 330 communicating with the throttle unit 6 communicate with the opening portion 524b.

In Mode 5, the supply of the cooling water to the throttle unit 6 is stopped, and the cooling water is supplied to the radiator 3, the heater 4, and the EGR cooler 5.

That is, Mode 5 is established in a state in which the rotor 500 is rotated back and forth about 40 degrees from the positions shown in FIGS. 18 and 19 in the clockwise direction.

In this state, the radial passages 36 and 61a in the region of the holding member 330 communicating with the throttle unit 6 are blocked by the outer contour surface 524, the radial passages 36 and 61a in the region of the holding member 310 communicating with the radiator 3 communicate with the opening portion 524a, and the radial passages 36 and 61a in the region of the holding member 320 communicating with the heater 4 communicate with the opening portion 523b.

In all Modes described above, the pressure of the cooling water flowing from the radial passage 36 into the second clearance C21 acts on the pressure receiving surface 714 of the annular seal member 710.

Therefore, the annular seal member 710 pressed by the pressure of the cooling water comes into contact with the annular stepped portion (pressed portion) 62 of the passage member 60 and presses the passage member 60 toward the rotor 500 so that the annular contact portion 63 is brought into close contact with the outer contour surfaces 523 and 534.

Further, due to the pressure of the fluid acting on the pressure receiving surface 714, the annular seal member 710 is pressed and expanded in the radial direction thereof, the inner circumferential surface 711 is pressed to be in closer contact with the outer wall surface 61b, and the outer circumferential surface 712 is also pressed to be in closer contact with the inner circumferential surface 33.

In this way, in addition to the biasing force of the biasing spring 80, the pressure of the fluid flowing from the radial passage RP through the second clearance C21 exerts a pressing force on the passage member 60 via the annular seal member 710 and also presses the annular seal member 710 against the passage member 60 and the holding member 30.

Therefore, the annular seal member 710 is brought into close contact with the passage member 60 and the holding member 30, and the annular contact portion 63 is reliably brought into close contact with the outer contour surfaces 523 and 524, and thus the sealing performance can be enhanced.

Figure 20:
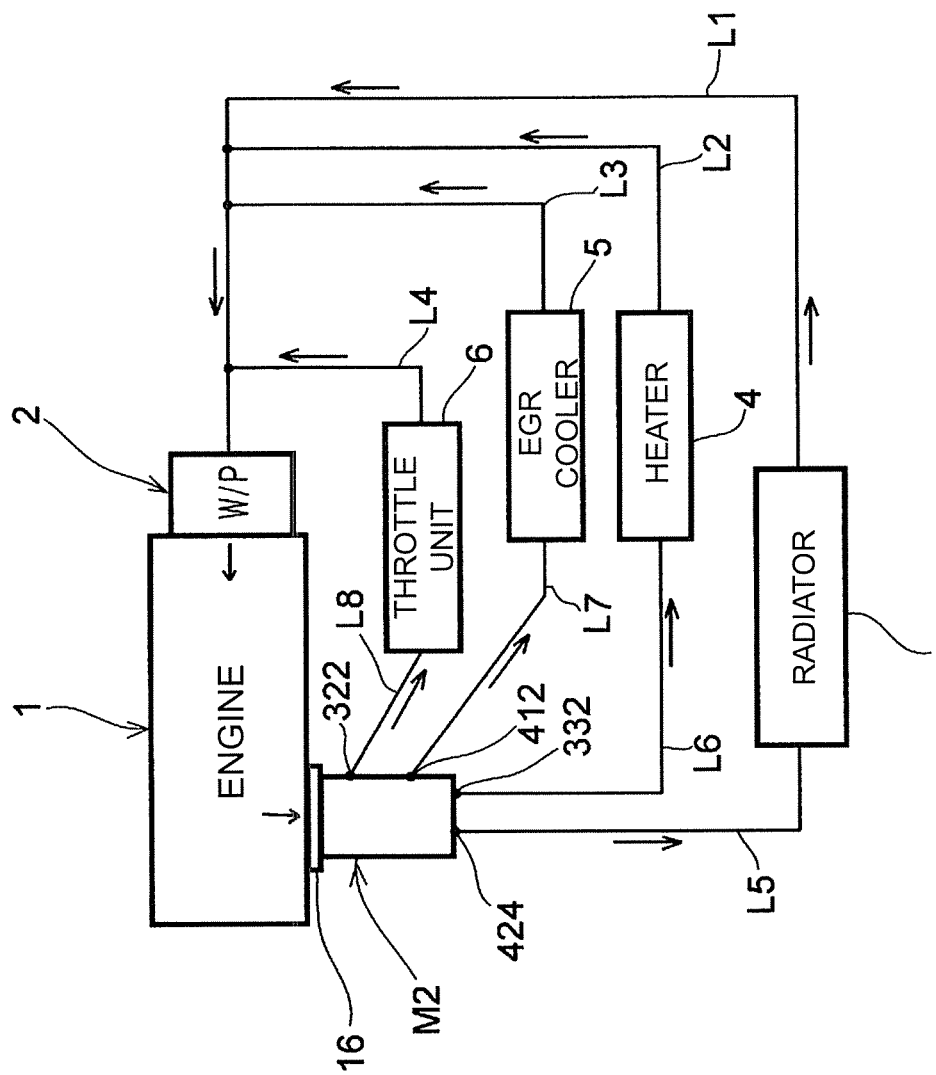

On the other hand, when the rotary type valve device M2 is used in the cooling water control system through which the cooling water flows from the axial passage AP toward the radial passage RP as shown in FIG. 20, it is possible to ensure similar sealing performance by incorporating the annular seal member 710 so that the pressure of the cooling water flowing from the axial passage AP through the first clearance C1 and the second clearance C22 acts on the pressure receiving surface 714 as shown in FIG. 10.

The case in which the annular seal member 710 is employed has been described in the above-described rotary type valve device M2, but the annular seal member 70 may be incorporated like the above-described embodiment.

In the above-described embodiment, the annular seal member 70 having a substantially rectangular cross section and the annular seal member 710 having a substantially U or V-shaped cross section are shown as the annular seal member. However, the disclosure is not limited thereto, and an annular seal member in which the concave pressure receiving surface is formed on both end surfaces may be adopted as long as it can maintain a shape of a predetermined range with respect to the pressure of the fluid.

In the above-described embodiment, the rotors 50 and 500 having the spherical outer contour surfaces 52c, 523 and 524 are shown as the rotor. However, the disclosure is not limited thereto, and a rotor having a cylindrical outer contour surface may be adopted, and a cylindrical passage member having an annular contact portion which can come into close contact with the outer circumferential surface of the rotor may be adopted as the passage member.

As described above, since the rotary type valve device according to the disclosure can ensure the passage having the excellent sealing performance in both the use form in which the fluid flows from the axial passage to the radial passage and the use form in which the fluid flows from the radial passage to the axial passage, it can be applied not only to a cooling water control system of a vehicle or the like but also to a fluid control system for controlling a flow of other fluids.

What is claimed is:

1. A rotary type valve device, comprising:
    a rotor having an internal passage formed around a predetermined axis and an opening portion which opens outward from the internal passage to an outer contour surface in a radial direction;
    a housing which supports the rotor to be rotatable with a predetermined first clearance and defines an axial passage communicating with the internal passage and a radial passage facing the outer contour surface and capable of communicating with the opening portion;
    a passage member disposed in the housing to define a part of the radial passage; and
    an annular seal member which seals a predetermined second clearance defined between an outer wall surface of the passage member and an inner wall surface of the housing,
    wherein the passage member comprises an annular contact portion which is pressed to be in close contact with the outer contour surface by a pressure of a fluid flowing from the axial passage, and a pressed portion pressed by the annular seal member to bring the annular contact portion into close contact with the outer contour surface by the pressure of the fluid flowing from the radial passage.

2. The rotary type valve device according to claim 1, wherein the pressed portion is formed to be pressed by the pressure of the fluid so that the annular contact portion is brought into close contact with the outer contour surface when the pressure of the fluid flowing from the axial passage through the first clearance acts.

3. The rotary type valve device according to claim 2, wherein the housing comprises a restricting portion which restricts movement of the annular seal member receiving the pressure of the fluid flowing from the axial passage through the first clearance.

4. The rotary type valve device according to claim 1, wherein the annular seal member has a concave pressure receiving surface on a side thereof receiving the pressure of the fluid.

5. The rotary type valve device according to claim 1, further comprising a biasing spring which biases the passage member toward the outer contour surface.

6. The rotary type valve device according to claim 5, wherein the housing comprises the passage member, the annular seal member, and a holding member which holds the biasing spring.

7. The rotary type valve device according to claim 6, wherein the holding member has a hooking portion which restricts separation of the holding member in a state in which the passage member is incorporated, and the passage member has a hooked portion which is hooked by the hooking portion.

8. The rotary type valve device according to claim 1, wherein the outer contour surface of the rotor is formed into a spherical surface, the annular seal member is formed into a circle-annular shape, the pressed portion of the passage member is formed into an circle-annular stepped surface with which the annular seal member comes into contact detachably, and the annular contact portion of the passage member is formed as a circle-annular seal lip of which a diameter is larger than the circle-annular stepped surface to be in close contact with the spherical surface.

9. The rotary type valve device according to claim 8, wherein the rotor comprises a plurality of outer contour surfaces which are continuous in a direction of the axis, and the housing comprises a plurality of radial passages which face the plurality of outer contour surfaces and are capable of communicating with the opening portion.

10. The rotary type valve device according to claim 1, wherein the passage member is formed of a resin material, and the annular seal member is formed of a rubber material.

11. The rotary type valve device according to claim 1, further comprising a drive mechanism which rotationally drives the rotor around the axis.

\* \* \* \* \*